(12) United States Patent
Koch et al.

(10) Patent No.: US 7,251,745 B2
(45) Date of Patent: Jul. 31, 2007

(54) TRANSPARENT TCP CONNECTION FAILOVER

(75) Inventors: Ruppert Koch, Santa Barbara, CA (US); Sanjay Hortikar, Goleta, CA (US); Louise E. Moser, Santa Barbara, CA (US); Peter M. Melliar-Smith, Santa Barbara, CA (US)

(73) Assignee: Availigent, Inc., San Jose, CA (US)

( * ) Notice: Subject to any disclaimer, the term of this patent is extended or adjusted under 35 U.S.C. 154(b) by 831 days.

(21) Appl. No.: 10/460,761

(22) Filed: Jun. 11, 2003

(65) Prior Publication Data
US 2004/0268175 A1    Dec. 30, 2004

(51) Int. Cl.
*G06F 11/00* (2006.01)
(52) U.S. Cl. ............................................. 714/11; 714/4
(58) Field of Classification Search ...................... None
See application file for complete search history.

(56) References Cited

U.S. PATENT DOCUMENTS

| | | | | |
|---|---|---|---|---|
| 5,513,314 A * | 4/1996 | Kandasamy et al. ........... 714/6 |
| 6,061,807 A * | 5/2000 | Albert et al. ................... 714/3 |
| 6,173,312 B1 * | 1/2001 | Atarashi et al. ............. 709/203 |
| 6,247,141 B1 * | 6/2001 | Holmberg ........................ 714/2 |
| 6,308,282 B1 * | 10/2001 | Huang et al. ................... 714/4 |
| 6,618,817 B1 * | 9/2003 | Armstrong ..................... 714/4 |
| 6,661,799 B1 * | 12/2003 | Molitor ....................... 370/401 |
| 6,760,861 B2 * | 7/2004 | Fukuhara et al. ............... 714/4 |
| 7,076,555 B1 * | 7/2006 | Orman et al. ............... 709/227 |
| 7,111,035 B2 * | 9/2006 | McClellan et al. ......... 709/201 |

* cited by examiner

*Primary Examiner*—Gabriel L. Chu
(74) *Attorney, Agent, or Firm*—John P. O'Banion

(57) ABSTRACT

Methods of transparent connection failover allowing a remote computer (i.e., a client), to continue to use a network connection to communicate with one of at least two or more other computers (i.e., the backup servers) over a network, when one of the other computers (i.e., the primary server) fails. With the mechanisms of this invention, there is no need for the client to establish a new connection to a backup server when the primary server fails. The failover is preferably executed within a bridge layer between the TCP layer and the IP layer of the server's TCP/IP stack. No modifications are required to the network infrastructure, the client's TCP/IP stack, the client application or the server application. The methods support active or semi-active replication of the server application, and do not require rollback of the application during failover. The invention also provides mechanisms for bringing up new backup servers.

116 Claims, 19 Drawing Sheets

TRANSPARENT TCP CONNECTION FAILOVER

STATEMENT REGARDING FEDERALLY SPONSORED RESEARCH OR DEVELOPMENT

This invention was made with Government support under Grant No. 70NANBOH3015, awarded by the U.S. Department of Commerce and National Institute of Standards and Technology. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to communication over a network between computers in the presence of faults in those computers, and more particularly to the execution of connection-oriented communication protocols.

2. Description of Related Art

Computers use communication protocols executed by communication routines for exchanging information between them. An important class of communication protocols is the class of connection-oriented communication protocols that operate over an underlying network communication protocol. The most-widely used communication protocols in this class today comprise the Transmission Control Protocol (TCP) operating on top of the Internet Protocol (IP).

Connection-oriented communication protocols require one computer (i.e., the client) to initiate a connection to another computer (i.e., the server). Once the connection is established, the client and the server can exchange data. The connection remains established until both client and server endpoints terminate the connection, or one endpoint fails.

To achieve fault tolerance of the server, the server is replicated with a primary server replica and one or more backup server replicas, so the client continues to receive service, despite the failure of a server. If the primary server fails, a backup server takes over the role of the failed primary server and the client establishes a new connection to the backup server. The operations involved in the backup server taking over the role of the failed primary are referred to as a failover operation. There are several approaches that allow the client to use the same server address to connect to the backup server and, thus, mask the fact that the client is communicating with a different server. The masking of the failover operation without the client having to establish a new connection to the backup server and, without any modification to the client computer's software or hardware, is the subject of this invention and is referred to as transparent connection failover.

Systems have been proposed that allow the client to maintain an established connection with the server even if the server fails. However, they often require modifications to the network infrastructure, the client application or the client computer's protocol stack. Those systems suffer from the drawback that the network and the client computers often belong to organizations that are different from that of the server and, therefore, the client's computer software or hardware cannot be easily modified.

U.S. Patent Publication No. 20010056492 describes a system in which client-server TCP/IP communication is intercepted and logged at a backup computer. When the server fails, the server application is restarted and all TCP/IP stack activity is replayed. The backup computer performs an IP takeover, in which it takes over the role of the server computer for the remaining lifetime of the connection. No modifications to the client's TCP/IP protocol stack, the client application or the server application are required. To operate properly, the backup computer must be operational before the connection between the client and the server is established. Although the failover happens transparently to the client, the failover time can be significant because the entire history of the connection must be replayed.

TCP splicing (O. Spatscheck, J. S. Hansen, J. H. Hartman and L. L. Peterson, Optimizing TCP forwarder performance, IEEE/ACM Transactions on Networking, vol. 8, no. 2, April 2000, pp.146-157) is a technique that is used to improve performance and scalability of application-level gateways. Clients establish TCP connections to a dispatcher application. The dispatcher chooses an appropriate server to handle a client connection, and then modifies the TCP/IP stack of the dispatcher computer to forward all TCP packets of the connection directly to the selected server. No further involvement of the dispatcher is required until the connection is terminated. TCP splicing requires all traffic to flow through the dispatcher.

TCP handoff (M. Aron, D. Sanders, P. Druschel and W. Zwaenepoel, Scalable content-aware request distribution in cluster-based network servers, Proceedings of the USENIX 2000 Annual Technical Conference, San Diego, Calif., June 2000, pp. 323-336) removes the dispatcher by letting the client connect directly to one of the servers. If the initial server decides that another server is better suited to handle the connection, it transfers the TCP connection state to an alternate server. TCP handoff requires a special front-end layer-4 switch that routes the packets to the appropriate server.

TCP migration (A. C. Snoeren, D. G. Andersen and H. Balakrishnan, Fine-grained failover using connection migration, Proceedings of the USENIX Conference on Internet Techniques and Systems, San Francisco, Calif., March 2001, pp.221-232) is a technique that is transparent to the client application but requires modifications to both the client and server TCP/IP stacks. Modifications to the network infrastructure (e.g., Internet routers, underlying protocols) are not required. The client or any of the servers can initiate migration of the connection. At any point in time, only one server is connected to the client. Multicasting or forwarding of the client's message is not possible.

Other researchers (F. Sultan, K. Srinivasan, D. Iyer and L. Iftode, Migratory TCP: Connection migration for service continuity in the Internet, Proceedings of the IEEE International Conference on Distributed Computing Systems, Vienna, Austria, July 2002, pp. 469-470) propose a TCP connection migration scheme that requires the cooperation of both the client and server TCP/IP stacks. The client initiates the migration. During the migration process, both servers must be operational, which renders this approach appropriate for load balancing but not useful for fault tolerance.

The Hydranet system (G. Shenoy, S. K. Satapati and R. Beftati, HydraNet-FT: Network support for dependable services, Proceedings of the IEEE International Conference on Distributed Computing Systems, Taipei, Taiwan, April 2000, pp. 699-706) replaces a single server with a group of server replicas. It does not require any modification of the client's TCP/IP stack. Instead, all IP packets sent by the client to a certain IP address and port number are multicast to the group of server replicas. For this scheme to work, all traffic must go through a special redirector, which resides on an Internet router. To maintain consistency between the server replicas, the system employs an atomic multicast protocol. The forwarding service is not restricted to TCP, but can accommodate any transport protocol that is based on IP.

The SwiFT system (H. Y. Huang and C. Kintala, Software implemented fault tolerance, Proceedings of the IEEE Fault Tolerant Computing Symposium, Toulouse, France, June 1993, pp. 2-10) provides fault tolerance for user applications. SwiFT consists of modules for error detection and recovery, checkpointing, event logging and replay, communication error recovery and IP packet rerouting. The latter is achieved by providing a single IP image for a cluster of server computers. Addressing within the cluster is done by Media Access Control (MAC) addresses. All traffic from the clients is sent to a dispatcher, which forwards the packets to one of the server computers. A client must run the SwiFT client software to reestablish the TCP connection if the server fails.

Rerouting of IP packets (A. Bhide, E. N. Elnozahy and S. P. Morgan, A highly available network file server, Proceedings of the 1991 USENIX Winter Conference, Dallas, Tex., January 1991, pp. 199-205) is proposed in a scheme that reroutes IP packets from a primary server to a backup server. If the primary server fails, the backup server changes its IP address to the address of the primary server. The backup server then sends a gratuitous Address Resolution Protocol (ARP) request to announce that it can now be found at the primary's address. From then on, all IP packets that are addressed to the primary server are sent to the backup server.

Replication of Web services (N. Aghdaie and Y. Tamir, Client-transparent fault-tolerant Web service, Proceedings of the IEEE International Conference on Performance, Computing and Communications, Phoenix, Ariz., April 2001, pp. 209-216) is used in a system that allows a client to continue to use a TCP connection transparently when the primary server fails. This approach does not require changes to the hardware or software infrastructure but, rather, uses two proxies at each server that are implemented in user space to avoid changes to the operating system of the server computer. The server application is passively replicated, and the backup proxy logs client requests and server replies. The drawback of their approach is the degraded performance that results from the context switches and protocol stack traversals that are needed for an implementation in user space.

Therefore, a need exists for a method of maintaining a network connection between a client and a replicated server without the need for the client to establish a new connection if one of the servers fails and without the need for any modifications to the application code, communication routines or other hardware or software infrastructure at the client, so that the connection failover is transparent to the client. The present invention satisfies those needs, as well as others, and overcomes the deficiencies of previously developed methods for providing network connection failover.

BRIEF SUMMARY OF THE INVENTION

To achieve transparent connection failover, the present invention requires two networked computers (i.e., the servers) that belong to the same subnet. One of the servers acts as the primary server, and the other acts as the backup server. Any one of the two servers can fail while connections to at least one other computer (i.e., the clients) are established, or are in the process of being established, or are in the process of being terminated. As long as at least one of the servers remains operational, the failure of a server remains transparent to a client and, in particular, a client does not need to establish a new connection to the backup server. The client and server roles as described herein are provided by way of example, and it should be appreciated that the roles of the client and the server may be reversed or temporarily assumed in either direction in relation to specific applications and/or connections being established over the network, without departing from the teachings herein.

The invention achieves transparent connection failover by utilizing a form of connection endpoint migration. The invention inserts a bridge sublayer between a connection-oriented communication protocol layer and an underlying network communication protocol layer. By way of example, the connection-oriented communication protocol layer is the Transmission Control Protocol (TCP) layer, and the underlying network communication protocol layer is the Internet Protocol (IP) layer. Although the present invention is described in the context of TCP operating over IP, it should be appreciated that the principles of the invention apply to other protocols as well.

Routines for maintaining a connection are preferably implemented in a bridge sublayer between the TCP layer and the IP layer of the server's TCP/IP stack. The invention does not require any modification to the network infrastructure, the server application, the client application or the client's TCP/IP stack.

In the standard TCP/IP protocol stack, the TCP layer resides above the IP layer. TCP accepts messages from the user application and divides the messages into TCP segments. The TCP segments are passed to the IP layer, where they are packed into IP datagrams. The routers that reside between a client computer and the server computers work at the IP layer and, therefore, have no knowledge of TCP. In TCP connection establishment, the server listens for incoming connection requests, and the client connects to the server.

In the present invention, the server application process is replicated on both computers, using active or semi-active replication. With active or semi-active replication, the server application runs on both primary and backup server computers. Both server processes accept connections, handle requests and generate replies. Server processes must exhibit the same deterministic behavior, which means that they generate identical replies on all connections. If the primary server process generates a reply, the backup server process must generate an identical reply. Because both servers undergo the identical state transitions and because the bridge synchronizes the state of the TCP layer of the primary and backup servers, state transfer of the application state and of the communication infrastructure state is not required to support transparent connection failover. However, bringing up a new backup server replica, or returning a failed and repaired server replica to the system, requires a state transfer to the new backup server replica of not only the application state but also the communication infrastructure state.

To failover a TCP connection endpoint from a primary server to a backup server in a manner that is transparent to the client, the IP datagrams that the client sends to the primary server must be redirected to the backup server, and the TCP protocol must be respected. The following are directed to that end:

(a) The backup server must have a copy of all TCP segments, sent by the client, that the primary server has acknowledged. The primary server must not acknowledge a client's TCP segment until it has received an acknowledgment of that segment from the backup server.

(b) The backup server must have a copy of all TCP segments, sent by the primary server, that the client has not acknowledged. If the client acknowledges a server's TCP segment, the primary server and each backup server must receive the acknowledgment and remove the TCP segment from its buffers.

(c) The backup server must synchronize its TCP sequence numbers with the TCP sequence numbers used by the primary server. The sequence number order must not be violated when a failover takes place. If a client detects a violation in the sequence number order, the client will disconnect and reinitiate the connection.

(d) The backup server must respect the Maximum Segment Size (MSS) and the maximum window size that were negotiated between the primary server and the client when the connection was established.

The present invention enables a TCP connection to continue to be utilized when the primary server has failed, and does not require changes to the client application, the client TCP/IP stack or other software or hardware at the client. The invention operates at the level of the TCP/IP stack of the server, and for a request/reply or a message/acknowledgment, requires preferably k+1 messages and at most 2k messages, where k is the number of server replicas.

The present invention provides transparent connection failover for a connection-oriented communication protocol where a client is connected to a replicated server over a network. In one embodiment, transparent connection failover is achieved by program code that executes within the communication code for: (a) communicating client requests to at least one backup server; and (b) migrating the connection endpoint from the primary server to the backup server when the primary server fails, in response to which the backup server receives and responds to the client requests while the client is still addressing the primary server and is unaware of the server failure or of the connection failover.

In another embodiment, an apparatus for transparent connection failover comprises (a) at least two server computers that execute routines for communicating with a client computer over a network; and (b) a means for modifying the address of a backup server computer within the communication routines of the backup server computer in response to the failure of the primary server computer, in order that the backup server computer can act as the endpoint of the connection and the new primary server. The means of modifying the address of the backup server is preferably performed within a bridge sublayer between the connection-oriented communication protocol layer and the underlying network communication protocol layer.

In a further embodiment, an apparatus for transparent connection failover comprises: (a) a server computer configured for executing a communication protocol with client computers over a network; and (b) program code within the server computer for executing the communication protocol for (i) communicating client requests to a primary server, (ii) communicating client requests to at least one backup server, (iii) communicating responses from the primary server to the client, and (iv) migrating the connection endpoint from the primary server to the backup server when the primary server fails, (v) wherein the backup server receives and responds to the client requests while the client is still addressing the primary server.

Another embodiment of the invention is a method of providing transparent connection failover for two or more computers that communicate with a remote computer over a network, comprising: (a) executing the same computations on two or more computers in response to communication from a remote computer using the Transmission Control Protocol (TCP) over the Internet Protocol (IP), and (b) migrating the connection endpoint upon the failure of one computer wherein the other of the computers continues to communicate with the remote computer.

In another embodiment, a method of ensuring transparent connection failover is described comprising: (a) executing communication routines on computers connected Within the network so that computations can be executed on a first computer in response to communication with a remote computer; (b) maintaining synchronization of at least a second computer with the first computer, within the communication routines, wherein the server application on the second computer executes the same computations as the server application on the first computer; and (c) migrating the connection endpoint, within the communication routines, from the first computer to the second computer if the first computer fails, providing transparent connection failover so that the remote computer still addresses the first computer but communicates with the second computer.

It should be appreciated that the preceding embodiments are provided by way of example and not of limitation, and that the inventive teachings and associated aspects of the invention may be described in a number of alternative embodiments.

An aspect of the invention is a method of providing transparent connection failover by using connection endpoint migration.

Another aspect of the invention is a transparent connection failover mechanism from a primary server to a backup server wherein the client does not need to establish a new connection with the backup server when the primary server fails.

Another aspect of the invention is a transparent connection failover mechanism that supports active or semi-active replication of the server application.

Another aspect of the invention is a transparent connection failover mechanism that does not require rollback of the application during failover.

Another aspect of the invention is a transparent connection failover mechanism in which the backup servers are synchronized with the primary server.

Another aspect of the invention is a transparent connection failover mechanism that is executed by routines in a bridge sublayer between a connection-oriented communication protocol layer and a network communication protocol layer.

Another aspect of the invention is a transparent connection failover mechanism in which the bridge routines replace the original (primary) destination address of incoming segments with that of another (backup) server.

Another aspect of the invention is a transparent connection failover mechanism in which the client is not cognizant of the failover, such as requiring it to establish a new connection with a backup server that has a different destination address from the primary server.

Another aspect of the invention is a failover mechanism that utilizes the Transmission Control Protocol (TCP) as the connection-oriented communication protocol and the Internet Protocol (IP) as the network protocol.

Another aspect of the invention is a bridge sublayer implemented between the TCP layer and the IP layer of the TCP/IP stack at the servers.

Another aspect of the invention is a transparent connection failover mechanism in which between k+1 and 2k messages are required for a request/reply or a message/acknowledgment, wherein k represents the number of server replicas.

Another aspect of the invention is a transparent connection failover mechanism that does not require proxies at each server and that is not implemented in user space.

Another aspect of the invention is a transparent connection failover mechanism that does not require replaying the connection history of the connection prior to performing the failover to another server.

Another aspect of the invention is a transparent connection failover mechanism that does not require traffic to be routed through a dispatcher.

A still further aspect of the invention is a transparent connection failover mechanism that requires no modification of the software running on remote or client computers, or to the TCP/IP protocol stacks on the remote or client computers.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
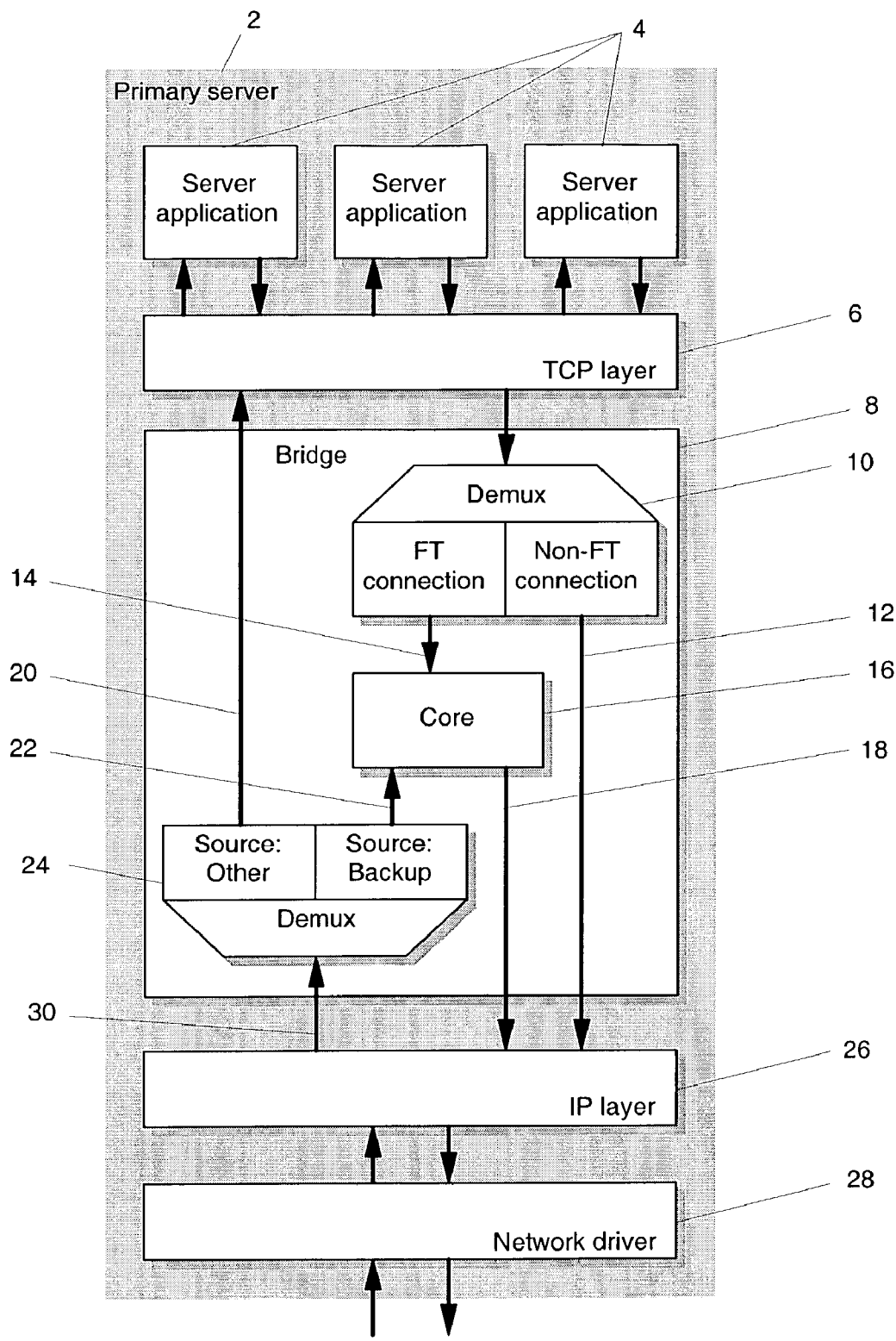
FIG. 1 is a block diagram of a primary server bridge sublayer between the TCP layer and the IP layer according to an aspect of the present invention, and shown with its core.

Referring more specifically to the drawings, for illustrative purposes the present invention is embodied in the apparatus generally shown in FIG. 1 through FIG. 18. It will be appreciated that the apparatus may vary as to configuration and as to details of the parts, and that the method may vary as to the specific steps and sequence, without departing from the basic concepts as disclosed herein.

1. Introduction.

It should be noted that the present invention is generally described in terms of a single client and two server replicas, a primary server and a backup server. However, the invention is easily generalized to multiple clients and k server replicas, where there is one primary server replica and k−1 backup server replicas, where k≧2.

A connection established by means of the present invention between a client and the servers is referred to as a fault-tolerant connection or FT connection. The 4-tuple (client IP address, client TCP port number, primary server IP address, primary server TCP port number) uniquely identifies a FT connection between a client and the servers.

The TCP connection failover mechanisms of this invention preferably reside between the TCP layer and the IP layer of the TCP/IP protocol stack of the primary and backup servers. This sublayer is referred to, as introduced by this invention, as the bridge, and comprises bridge routines. Although each server must be able to operate as a primary server or a backup server, the functionality of the bridge is different in the two cases, as described below.

The primary server bridge contains the core, which comprises two queues: the primary server output queue and the backup server output queue. The primary server output queue contains payload bytes that the primary server's TCP layer generates. The backup server output queue contains payload bytes that the backup server's TCP layer generates. The primary server bridge maintains a primary server output queue and backup server output queue for each FT connection between a client and the servers. The primary server bridge adjusts the sequence numbers of all outgoing TCP segments that it receives from the TCP layer, and all acknowledgment sequence numbers of incoming TCP segments that it receives from the IP layer.

The backup server bridge does not contain the core. However, it replaces the original destination (client) address of an outgoing TCP segment with the address of the primary server and puts the client address in the TCP options field. Correspondingly, the backup server bridge replaces the original (primary server) destination address of an incoming TCP segment with the address of the backup server. In the description of the inventive embodiment below, the backup server bridge does not adjust the sequence numbers of outgoing TCP segments or the acknowledgment sequence numbers of incoming TCP segments. However, it should be appreciated that the invention may be implemented to require the backup server bridge to make such adjustments.

2. Description of a Preferred Embodiment.

The connection failover mechanisms of this invention are described for a single TCP connection between a single client and a replicated server, where there are two server replicas, although the mechanisms are easily extended to multiple clients and more than two replicas of the server. The behavior of the system is considered in the fault-free case, and then its behavior is examined when the primary server or the backup servers fail, after which connection establishment and disestablishment procedures are described. The process of starting up a new backup replica is also described.

2.1. Maintaining the State of a TCP Connection in the Fault-Free Case.

A client computer C is considered that runs a client application, and a primary server computer P and a backup server computer B that each run the same server application.

In the standard TCP/IP protocol stack, when the client application issues a request to the server application, it passes a request message to the TCP layer of the client computer. The TCP layer packs the data of the request message into TCP segments, and passes the TCP segments to the IP layer. Each TCP segment has a unique sequence number. The IP layer packs the TCP segments into an IP datagram. The IP datagram header contains the IP address of the sender (source) computer and the IP address of the receiving (destination) computer.

In the present invention, the source address is the IP address of client computer C, which is denoted herein by $A_c$, and the destination address is the IP address of primary server computer P, which is denoted herein by $A_p$. When primary server computer P receives a datagram from client computer C, the IP layer of primary server computer P delivers the payload of the datagram to the TCP layer, which then extracts the client's request and passes it to the server application.

The IP layer of backup server B, whose network interface runs in promiscuous mode, also receives all datagrams from client computer C. The backup server bridge discards the payload of any datagram that does not contain a TCP segment or that is not addressed to primary server P. For the payload of any other datagram, it replaces the original destination field with the address AB of backup server B in the TCP segment header and passes the TCP segment to the TCP layer of backup server B. When it processes the TCP segment, the TCP layer assumes that client C sent this segment directly to backup server B.

After the server applications have processed the client's request, they generate a reply. Assuming that the server applications behave deterministically, both replies are identical. The TCP layers of the primary server and the backup server pack the replies into TCP segments. Note that, although the application replies are identical, the TCP layers might not generate identical sets of TCP segments. For example, due to flow control, the TCP layer of one of the servers might split the reply into multiple TCP segments, while the TCP layer of the other server might pack the entire reply into a single segment.

When the primary server bridge obtains TCP segments from the TCP layer, it puts the payload data in the primary server output queue and waits until it receives corresponding data from backup server B. The primary server bridge must not send any data to the client until it has received the data from both backup server B and its own TCP layer.

The TCP layer of backup server B passes TCP segments to the backup server bridge. If the backup server bridge receives a segment that is addressed to client C, it replaces the destination address field of the segment with the address of primary server P. Thus, all TCP segments intended for the client are diverted to primary server P. The backup server bridge includes the original destination address of the segment in the segment as a TCP header option.

When the primary server bridge receives the TCP segment that backup server B sent, it matches the segment's payload data against the data in the primary server output queue. The primary server bridge builds a new segment that contains the matching payload bytes. The remaining bytes of the original segment are queued in the backup server output queue. The new segment carries the address of primary server P in the source field and the address of client C in the destination field.

The acknowledgment field contains the smaller of the two acknowledgment sequence numbers of the last segments that the primary server bridge received from primary server P and backup server B. Choosing the smaller of the two acknowledgment sequence numbers guarantees that both servers have received all of the client's data up to that sequence number.

Similarly, the window size field contains the smaller of the two window sizes of the last segments that the primary server bridge received from primary server P and backup server B. Choosing the smaller of the two window sizes adapts the client's send rates to the slower of the two servers and, thus, reduces the risk of segment loss.

The primary server bridge maintains a variable $\Delta_{seq}$, which is the offset in the sequence numbers that the TCP layers of primary server P and backup server B assign to segments that they send to client C. When they establish a new connection to client C, primary server P and backup server B choose initial sequence numbers $seq_{P, init}$ and $seq_{B, init}$. The primary server bridge calculates the sequence number offset $\Delta_{seq}$ as the difference of those initial sequence numbers: $\Delta_{seq} = seq_{P, init} - seq_{B, init}$. Subsequently, to compare the sequence numbers of TCP segments sent by P and B, the primary server bridge subtracts $\Delta_{seq}$ from the sequence numbers of each segment that it receives from the primary server's TCP layer.

Figure 2:
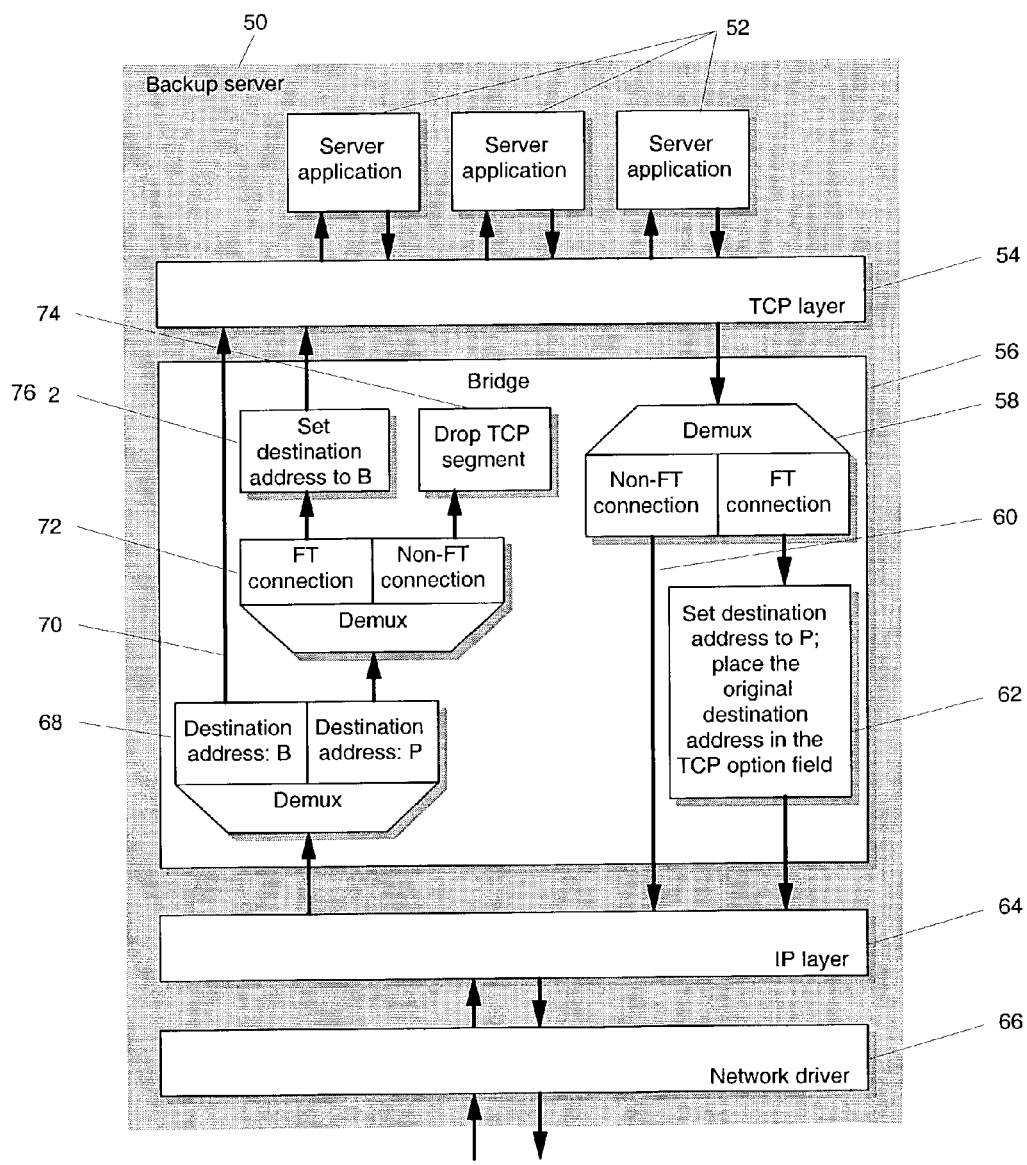
FIG. 2 is a block diagram of a backup server bridge sublayer between the TCP layer and the IP layer according to an aspect of the present invention.
Figure 3:
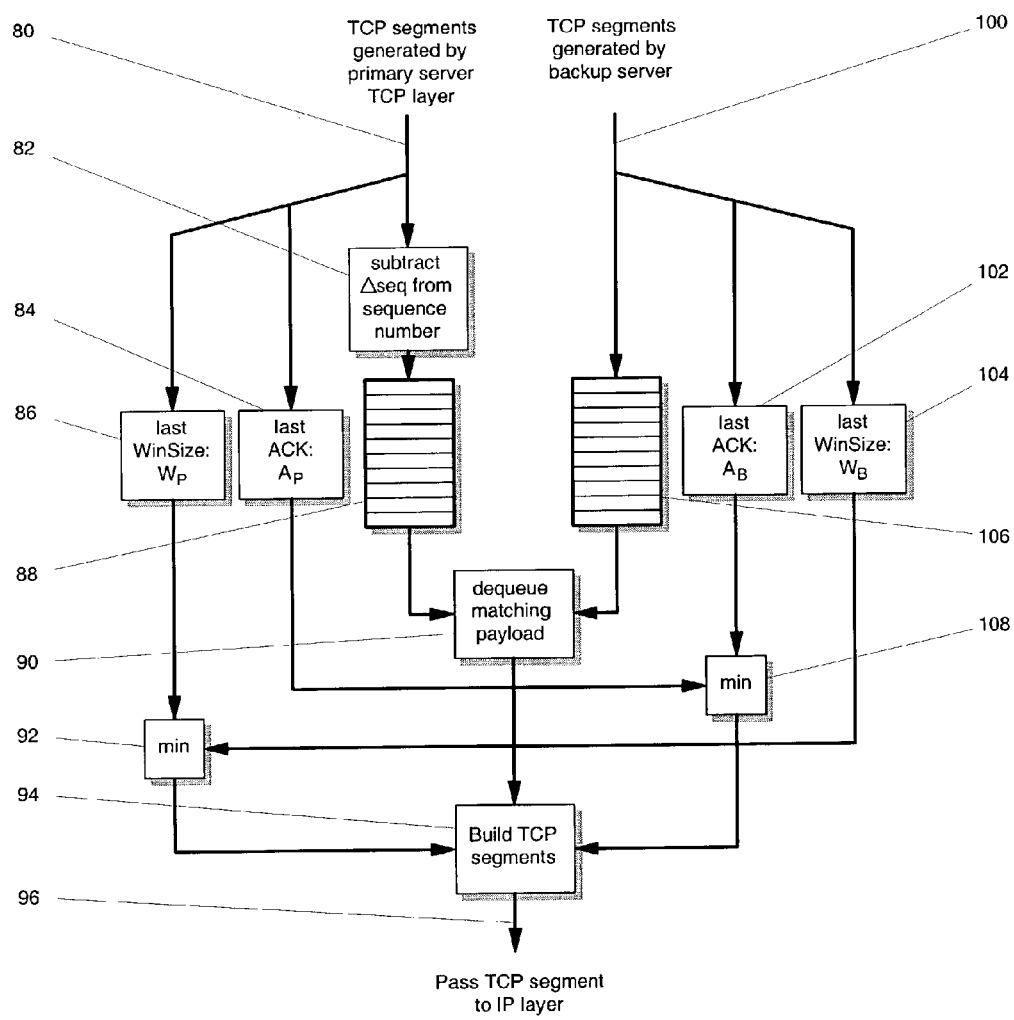
FIG. 3 is a block diagram of the core of the primary server bridge according to an aspect of the present invention.
Figure 4A:
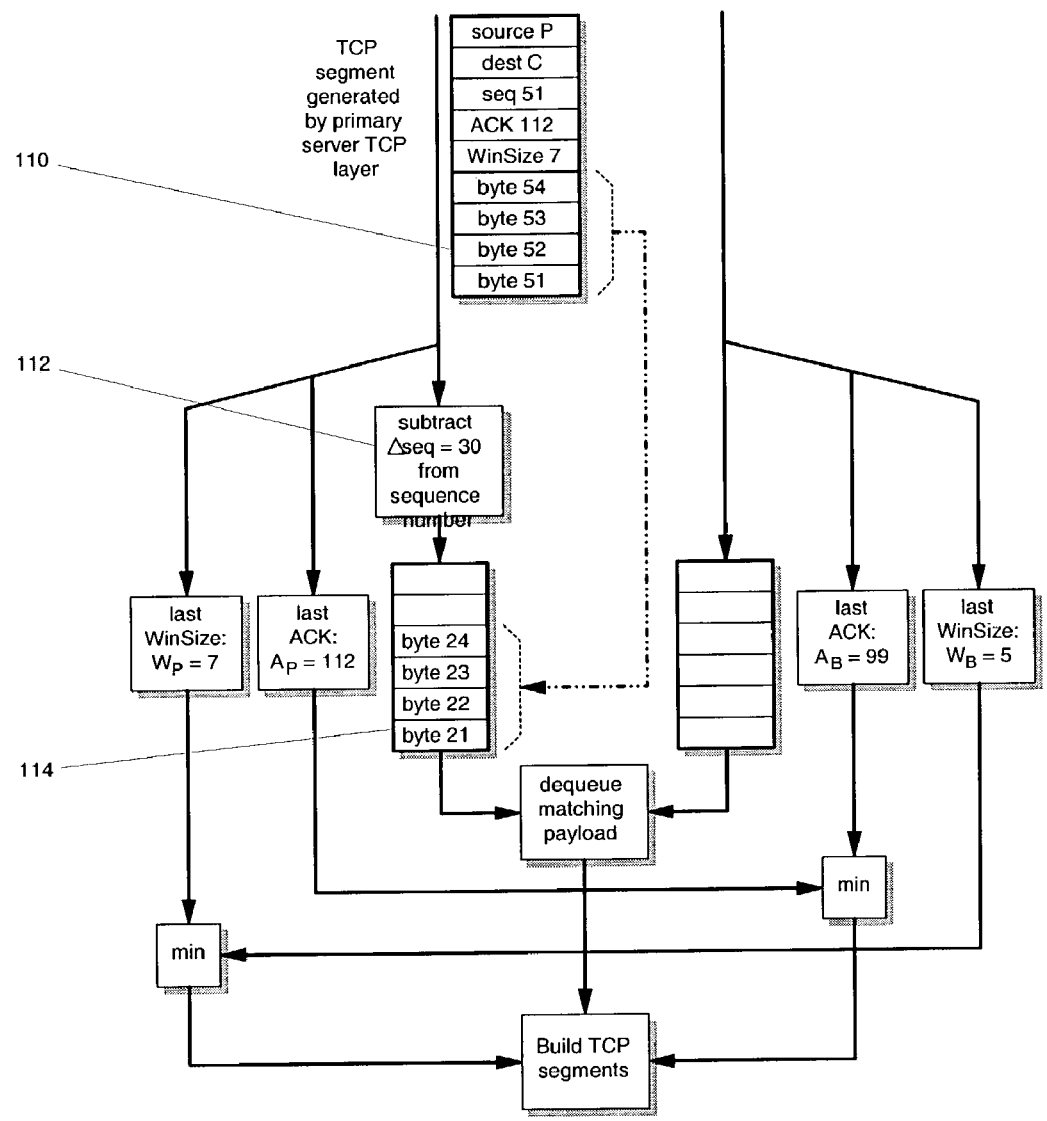
FIG. 4A and FIG. 4B is a block diagram depicting an example of how the core of the primary server bridge modifies the sequence numbers of the payload bytes according to an aspect of the present invention.
Figure 4B:
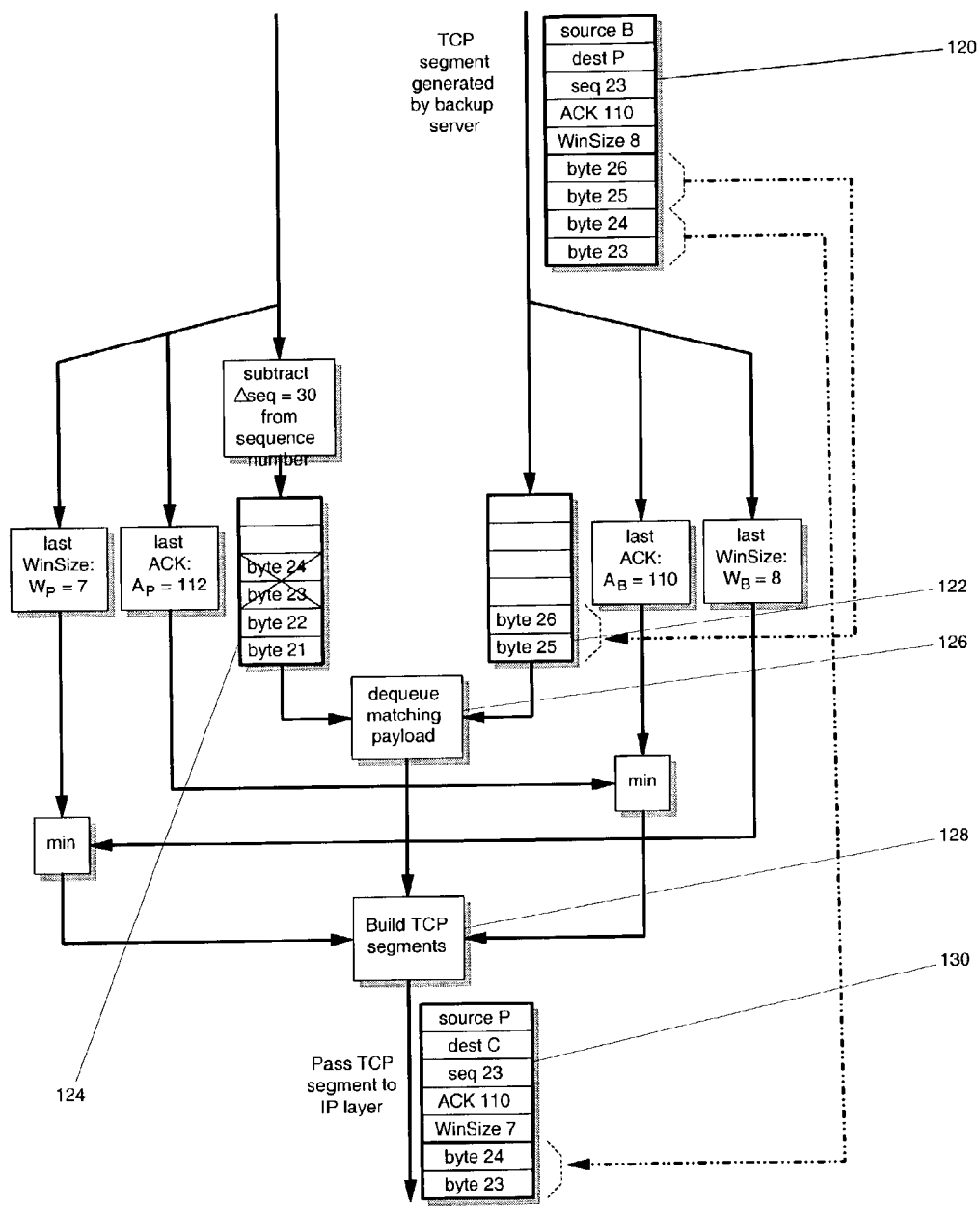

FIG. 1 through FIG. 3 depict the bridge within the present invention. FIG. 1 represents the bridge within a primary server, while FIG. 2 depicts the bridge within a backup server. The method described above is reflected in FIG. 3. The left side of the figure shows the primary server bridge receiving a segment from the primary server TCP layer. FIG. 4A and FIG. 4B illustrate an example in which the primary server bridge is modifying the sequence numbers of the payload bytes.

If a bridge receives a TCP segment from a server but cannot build a TCP segment because the other server's queue does not contain any matching payload, it compares the minimum of P's and S's most recent acknowledgments with the acknowledgment of the previous TCP segment that it built. If the former is greater than the latter, the bridge constructs a TCP segment with no payload to acknowledge the client's segment. This prevents a deadlock in the case that the server application does not send any data to the client.

In standard TCP, acknowledgments of segments are piggybacked onto segments that are sent in the opposite direction. If no data are sent in the opposite direction, TCP creates a TCP segment that carries no user data, which is referred to as a delayed acknowledgment.

In this embodiment of the present invention, if the bridge receives such a delayed acknowledgment, it updates the ACK and WinSize fields of the segment header and compares the new ACK value with the ACK value of the last segment that it sent to the client. If the former is greater than the latter, the bridge constructs a TCP segment with no payload.

2.2. Loss of Messages.

In standard TCP, dropping a TCP segment m has several effects at the intended destination. First, the destination will not acknowledge m or any later segments that the source of m sends. When the source's retransmission timer expires, the source retransmits m. Second, the destination will not receive the acknowledgment $ack_k$ that the source attached to m and that acknowledges the destination's segment k. If the source does not send additional TCP segments that acknowledge the destination segment k, the destination retransmission timer expires, and the destination retransmits segment k.

The present invention handles such loss of segments, which can occur at several places, as follows:

(a) The primary server P does not receive the client's segment m, but the backup server receives it. In this case, the TCP layer of primary server P does not acknowledge m. Consequently, the primary server bridge does not acknowledge m. Client C retransmits m after its retransmission timer expires. Segment m might carry an acknowledgment $ack_k$ for a segment k that the servers sent. Because the primary server does not receive $ack_k$, it retransmits k. By comparing the sequence number of segment k with the sequence number of the last segment that it sent, the primary server bridge recognizes that segment k is a retransmission and that it has already received a copy of segment k from the backup server. Therefore, the primary server bridge does not queue segment k, waiting for a copy of segment k from the backup server; rather, it transmits segment k immediately.

(b) The backup server does not receive the client's segment m, but the primary server receives it. This case is similar to case (a) in that the backup server retransmits segment k and the primary server bridge transmits segment k, without waiting to receive a retransmission of segment k from the TCP layer of primary server P, because it has already received segment k from the TCP layer of primary server P.

(c) The client transmits segment m containing the acknowledgment $ack_k$, but neither primary server P nor backup server B receives segment m and, thus, neither receives $ack_k$. In this case, the TCP layers of both primary and backup servers retransmit segment k. When the primary server bridge receives either of those retransmissions, it immediately transmits segment k to the client, for the reasons described above in cases (a) and (b) above.

(d) The primary server bridge does receive segment k that backup server B sent and, thus, will not send any more segments to client C until it has received the segment k. Consequently, client C will not acknowledge the segment k, and both servers will retransmit k. If the primary server bridge receives the retransmission of segment k from backup server B before it receives the retransmission of k from the primary server's TCP layer, the bridge recognizes that it has already received the transmission of k from the primary server's TCP layer and, thus, it immediately transmits k to the client. If the primary server bridge receives the retransmission of k from the primary server's TCP layer before it receives the retransmission of k from backup server B, it finds segment k in the primary server queue and discards the second copy of k that it received from the primary server's TCP layer.

(e) Client C does not receive the segment k transmitted by the primary server bridge to the client. Consequently, client C will not acknowledge segment k. The TCP layers in both primary server P and backup server B will retransmit k. The handling of these retransmissions is essentially equivalent to that described in case (c) above where the acknowledgment transmitted by the client was not received by either server. Consequently, the primary server bridge will retransmit k twice.

2.3. Failure of the Primary Server.

Primary server P and backup server B must exchange heartbeat messages on a regular basis. If backup server B determines that it is not receiving heartbeats from primary server P, it performs a reconfiguration procedure generally comprising the following steps:

(a) Disable the sending of heartbeats by backup server B.

(b) Request the backup server bridge to stop sending TCP segments, that are addressed to client C, to the IP layer.

(c) Disable the promiscuous receive mode of the network interface of backup server B.

(d) Disable the $A_P$-to-$A_B$ address translation of the destination field for incoming TCP segments of FT connections.

(e) Disable the $A_C$-to-$A_P$ address translation of the destination field for outgoing TCP segments of FT connections.

(f) Change the IP address of backup server B to the address of primary server P and send a gratuitous ARP request packet.

(g) When the change of the IP address is completed, resume sending TCP segments by the backup server bridge.

After the reconfiguration of the backup server bridge, backup server B sends its TCP segments directly to client C, and behaves like any standard TCP server.

Note that, during the reconfiguration of the backup server bridge, neither the sequence number nor the ACK sequence number nor the window size needs to be changed.

2.4. Failure of the Backup Server.

If primary server P determines that it is not receiving heartbeats from backup server B, it performs a reconfiguration procedure generally comprising the following steps:

(a) Remove all payload data from the primary server output queue, place the data into a newly created TCP segment (or multiple TCP segments, if necessary), and send the TCP segment to client C.

(b) Disable the demultiplexer for incoming IP datagrams. Route all incoming TCP segments directly to the TCP layer.

(c) Disable the delay of TCP segments that primary server P created. Do not modify the acknowledgment field or the window size of those segments. But, continue to subtract the offset $\Delta_{seq}$ from the sequence number field of all outgoing TCP segments that are addressed to client C.

After the completion of the recovery from the failure of the backup server B, all TCP segments that primary server P sent to client C contain the acknowledgment and the window size that the TCP layer of primary server P chose.

During normal operation, all segments that the primary server bridge sends to client C carry sequence numbers that the TCP layer of backup server B assigned. The primary server bridge adjusts all of the sequence numbers that the TCP layer of primary server P assigned by subtracting $\Delta_{seq}$.

If backup server B fails, the primary server bridge does not discontinue subtracting the offset because the TCP layer of client C is synchronized to the sequence numbers that backup server B generated.

2.5. Client-Initiated Connection Establishment.

The establishment of a standard TCP connection is a three-way handshake. First, the client sends a TCP segment to the server that has the synchronization flag (SYN segment) set. The SYN segment specifies a server port and contains the client's initial sequence number. Second, if the server accepts the connection, it sends back a SYN that acknowledges the client's SYN. The server's segment contains the server's initial sequence number and an acknowledgment of the client's SYN segment. Third, the client acknowledges the server's SYN segment. The connection is then established, and either side can send TCP segments.

The present invention establishes a FT connection as follows:

(a) The backup server bridge performs the address translation of the destination address of the outgoing SYN segments. It then decrements the Maximum Segment Size (MSS) field of the segment by 8 bytes for IPv4 (where 4 bytes are used to mark the option and 4 bytes are used for the client address in the TCP options field) and 20 bytes for IPv6 (where 4 bytes are used to mark the option and 16 bytes are used for the client address in the TCP options field). The primary server bridge receives the initial SYN segment from the client and passes the SYN segment to the TCP layer.

(b) When the TCP layer of primary server P accepts the connection request, it sends a SYN segment to the primary server bridge.

(c) On receiving this segment from the TCP layer, the primary server bridge creates the primary and backup server output queues, and then queues the segment. The primary server bridge stores the sequence number $seq_{P,init}$ of that segment to be able to perform the sequence number offset calculation.

(d) The backup server bridge receives the initial SYN segment from client C, does the address translation of the destination address of the segment, and passes the SYN segment to the TCP layer.

(e) When the TCP layer of backup server B accepts the connection request, it passes a SYN segment to the backup server bridge.

(f) The backup server bridge then passes the segment to the IP layer.

(g) When the primary server bridge receives the SYN segment that the TCP layer of backup server S sent, it calculates the sequence number offset $\Delta_{seq}$ by subtracting the sequence number $seq_{B,init}$ of the SYN segment from $seq_{P,init}$.

(h) The primary server bridge now builds the SYN segment that is to be sent to the client. It sets the MSS field of that segment to the minimum of the MSS fields contained in the SYN segments created by the TCP layers of primary server P and backup server B.

(i) The primary server bridge passes the segment to the IP layer.

(j) The TCP layer of client C receives the SYN segment from primary server P and responds by sending an acknowledgment.

(k) The primary server bridge and backup server bridge handle the acknowledgment segment in the same way as future incoming segments.

2.6. Server-Initiated Connection Establishment.

Primary server P and backup server B initiate the establishment of a TCP connection to a third-tier back-end server by sending a SYN segment. The TCP layers of the primary server and the backup server both generate a SYN segment. When it receives the first SYN segment, the primary server bridge creates the primary and backup server output queues and queues the TCP segment. When a server's bridge receives the other server's SYN segment, it calculates the sequence number offset, creates a SYN segment and sends it to the third-tier back-end server.

When the TCP layer of the third-tier back-end server accepts the connection request, it sends a SYN segment in return. Both the primary server bridge and the backup server bridge handle the acknowledgment segment in the same way as future incoming segments. The servers complete the three-way handshake by sending an acknowledgment for the client's SYN segment.

2.7. Connection Termination.

The termination of a standard TCP connection is a four-way handshake. Either side can initiate the connection termination process. Each direction of the connection is shut down independently of the other. To terminate one direction of a TCP connection, the sending endpoint sends a TCP segment that has the FIN flag set. The other endpoint acknowledges the FIN segment. The connection is now in a half-closed state, in which the endpoint that has not sent the FIN is still allowed to send data. The other endpoint must acknowledge all incoming segments, but is not allowed to send data. The half-closed state prevails until the side that remained active sends a FIN. As soon as the other side acknowledges the FIN, the connection is closed.

In the present invention, if client C initiates the connection termination, the FT connection is terminated as follows:

(a) The primary server bridge receives a FIN segment from client C. It marks the TCP client-to-server direction of the connection as closed, and then passes the FIN segment to the TCP layer.

(b) When the primary server bridge has received a FIN segment from the TCP layer of primary server P and backup server B, it marks the connection as closed and then sends the FIN segment to client C.

(c) When the primary server bridge receives the client's acknowledgment of the servers'FIN segment, it deletes all internal data structures that were allocated for that connection and passes the acknowledgment to the TCP layer.

(d) If backup server B does not receive the client's acknowledgment for the FIN segment within a timeout, B retransmits the FIN segment. When the primary server bridge receives a FIN that B sent after it deleted all internal data structures associated with the connection, it creates an acknowledgment on behalf of the client and sends the acknowledgment to B.

In the present invention, if the servers initiate the connection termination, the FT connection is terminated as follows:

(a) The primary server bridge receives a FIN segment from the TCP layer of primary server P and backup server B. The bridge marks the server-to-client direction of the connection as closed, and then sends the FIN segment to the client.

(b) When the primary server bridge receives the FIN segment sent by client C, it marks the connection as closed and passes the FIN segment to the TCP layer.

(c) When the primary server bridge receives the acknowledgment of the client's FIN from the TCP layer of the primary server and the backup server, the primary server bridge deletes all internal data structures that were allocated for that connection and sends the acknowledgment to the client.

(d) If client C does not receive the servers' acknowledgment, it retransmits the FIN segment. When the primary server bridge receives a FIN segment sent by client C after the primary server bridge has removed all internal data structures associated with the connection, it creates an acknowledgment and sends it back to client C.

2.8. Starting a New Backup Server.

The process of starting a new backup server involves the following steps. The primary server checkpoints its state by performing the following operations:

(a) Capture the state of the server application.

(b) Capture the state of the TCP connections that the server application currently uses, including the socket buffer state.

(c) Save the sequence number offset of all TCP failover connections.

(d) Prepare the primary server bridge to collaborate with the backup server by creating the backup server output queue and initializing the data structures and variables.

(e) Change the primary server bridge mode from BACK-UP_SERVER_DOWN to BACKUP_SERVER_UP.

(f) Communicate the state to the backup server.

Operations (a) through (e) must be executed atomically. After they are executed, the bridge sends TCP segments to the client only if it has received the corresponding segments from the primary server TCP layer and the backup server.

To start a new backup server, the following operations are performed at the new backup server:

(g) Receive the state from the primary server.

(h) Start the server application and upload the application state.

(i) Create the ongoing TCP connections by uploading the state of the TCP layer for those connections.

(j) Modify the sequence number counter of the TCP layer (subtract seqOffset) so that all outgoing TCP segments transmitted by the backup server have the sequence numbers expected by the client and thus require no modification in the primary server bridge. The sequence numbers of segments, pending transmission or acknowledgment, must also be modified.

(k) Modify the Maximum Message Size (MSS) for all established connections that the server applications maintain. This ensures that the segments provide enough space to attach the original client address to the TCP header.

(l) Enable address translation.

(m) Put the backup server into promiscuous receive mode.

Operations (h) though (m) must be executed atomically. With the exception of the sequence number offset, it is not necessary to transfer the rest of the bridge state. Operations (c) and (j) are necessary because the primary server's TCP layer uses different sequence numbers than the client uses. In the embodiment described earlier, the backup server does not modify sequence numbers. Therefore, the TCP layer state is modified, so that the sequence numbers of all outgoing segments conform to the client's sequence numbers and, similarly, for the acknowledgment sequence numbers of all incoming segments.

3. Alternative Embodiments.

The method described above can be modified in several ways, a few of which are described below by way of example.

3.1. Modification 1: No IP Failover of Backup Server.

As described previously, the backup server takes over the IP address of the primary server when the primary server fails. Modification 1 does not require the backup server to take over the primary server's IP address. If the primary server fails, the backup server remains in promiscuous mode, and the backup server bridge continues to modify the destination address of incoming TCP segments and the source address of outgoing TCP segments.

3.2. Modification 2: No Promiscuous Receive Mode.

As described previously, the backup server obtains the client's segments by putting its network interface in promiscuous mode. Modification 2 does not require the use of promiscuous receive mode. The primary server bridge copies the TCP segment it received from the client and sends it to the backup server. The client's IP address is stored in the TCP options field of the segment.

Modification 1 and modification 2 are incompatible. If the backup server does not receive the client segments through an interface that operates in promiscuous mode, it must take over the primary server's IP address when the primary server fails.

3.3. Modification 3: Adjustment of Sequence Numbers and Acknowledgment Sequence Numbers.

In the method described above, only the primary server bridge adjusts the sequence numbers and the acknowledgment sequence numbers. Alternatively, both the primary server bridge and the backup server bridge could perform the adjustments of the sequence numbers and acknowledgment of sequence numbers.

If the backup server adjusts the sequence numbers and acknowledgment sequence numbers then, when a new backup server is brought up, the TCP layer state for the sequence numbers and acknowledgment sequence numbers does not need to be modified.

3.4. Modification 4: Sending and Comparing Payload Bytes.

In the method described above, the backup server bridge sends the TCP segment, including the payload data that it received from its TCP layer, to the primary server. The primary server bridge compares the payload data bytes that it received in the TCP segment from the backup server bridge with the corresponding payload data bytes in the TCP segment that it received from its own TCP layer.

Alternatively, the backup server bridge does not send the payload data bytes of the TCP segment that it received from its TCP layer, to the primary server bridge. Instead, the backup server bridge sends a TCP segment containing the following fields from the TCP segment header: the address of the client, the TCP sequence number, the length of the payload data, the acknowledgment sequence number, the Maximum Segment Size and the window size.

When the primary server bridge receives the TCP segment without the payload data bytes, from the backup server, the primary server bridge matches the sequence number and data length contained in that segment against the sequence numbers of the data in the primary server output queue. The primary server bridge builds a new segment that contains the data bytes from the primary server output queue whose sequence number match the sequence numbers that it received from the backup server bridge. Any unmatched sequence numbers that it received from the backup server are stored in the backup server output queue. The new TCP segment carries the address of the primary server in the source field and the address of the client in the destination field.

3.5. Modification 5: Adjustments of Sequence Numbers in Captured State.

Section 2.8 above describes how the state of the TCP connections can be checkpointed to start a new backup server. It is possible to modify the sequence numbers by modifying the state captured in operation (b) of Section 2.8. The parts of the captured state that correspond to sequence numbers are modified. This modification eliminates the need to perform operation (k) of Section 2.8. The modification of the captured state can be performed in either the primary server or the backup server. If the modification of the captured state is performed in the primary server, the sequence number offset, determined in operation (c) of Section 2.8 above, does not need to be communicated to the backup server.

4. Detailed Descriptions of Figures.

FIG. 1 illustrates an example of functional blocks within a primary server computer 2. The primary server computer hosts one or more applications 4, which communicate with a TCP layer of that computer 6. A primary server bridge 8 resides between the TCP layer and the IP layer.

Outgoing TCP segments are passed to a demultiplexer 10. TCP segments that do not belong to a FT connection are passed 12 directly to IP layer 26. TCP segments that belong to a FT connection are passed to a core 16 of the primary server bridge.

Incoming TCP segments that are delivered by IP layer 26 of the primary server computer are passed 30 to the primary server bridge. A demultiplexer 24 separates the incoming segments by their source addresses. Segments from a computer other than the backup server are passed directly 20 to the TCP layer. Segments from the backup server are passed 22 to the core of the primary server bridge.

If the core has received bytes 14 with identical sequence numbers from the primary server's TCP layer 6 and bytes 22 from the backup server, it generates TCP segments that contain those bytes, addresses the segments to the client, and passes 18 those bytes to IP layer 26. IP layer 26 packs the TCP segments into an IP datagram and passes it to the network driver 28, which sends the datagram to the client.

FIG. 2 illustrates an example of functional blocks within a backup server 50, which hosts one or more server applications 52. The applications are identical to those running on primary server 4. The applications communicate with a TCP layer 54. A backup server bridge 56 resides between TCP layer 54 and an IP layer 64.

Outgoing TCP segments are passed to a demultiplexer 58. TCP segments that do not belong to a FT connection are passed 60 directly to IP layer 64. The backup server bridge replaces 62 the original destination (client) address of each TCP segment that belongs to a FT connection with that of the primary server and places the client address in the TCP options field of the TCP segment, and then passes the TCP segment to IP layer 64. IP layer 64 packs the TCP segment into an IP datagram and passes it to a network driver 66, which sends the datagram to the primary server.

Incoming TCP segments are passed to the backup server bridge only if they are addressed to the primary server or the backup server. A demultiplexer in the backup server bridge separates the incoming segments by their destination address 68. Segments that are addressed to the backup server are passed directly 70 to the TCP layer. Segments that are addressed to the primary server are passed to a second demultiplexer 72. If a segment does not belong to a FT connection, the backup server bridge drops the TCP segment 74. If a segment belongs to a FT connection, the backup server bridge replaces the original (primary server) destination address with the address of the backup server B 76, and then passes the segment to the TCP layer 54.

FIG. 3 shows the core of the primary server bridge. The core accepts a TCP segment that the primary server's TCP layer generated 80. The core adjusts the sequence number of the TCP segment 82. The core saves the value in the TCP segment's ACK field in the variable $A_P$ 84 and the values in the TCP segment's window size field in the variable $W_P$ 86.

If the payload in a TCP segment matches any payload in the backup server output queue 106, the core creates one or more TCP segments 94. It dequeues from the backup server output queue 90 matching payload bytes, and queues in the primary server output queue 88 all payload bytes that are not contained in the backup server output queue.

The core writes the minimum of the values of the variables $A_P$ and $A_S$ into the acknowledgment field of a new TCP segment 108. The core writes the minimum of the values of the variables $W_P$ and $W_B$ into the window size field of the new TCP segment 92. Once the TCP segment is complete, the core passes 96 the segment to the IP layer of the primary server.

If the core receives a TCP segment that the backup server generated 100, the core saves the value of the TCP segment's ACK field in a variable $A_B$ 102, and it saves the value of the TCP segment's window size field in a variable $W_B$ 104.

If the payload of a TCP segment matches any payload in the primary server output queue 88, the core creates one or more TCP segments 94. It dequeues from primary server output queue 90 all matching payload bytes, and it queues in backup server output queue 106 all payload bytes that are not contained in the primary server output queue.

The core writes the minimum of the values of the variables $A_P$ and $A_S$ into the acknowledgment field of a new TCP segment 108. The core writes the minimum of the values of the variables $W_P$ and $W_B$ into the window size field of new TCP segment 92. Once the TCP segment is complete, the core passes 96 the segment to the IP layer of the primary server.

FIG. 4A and FIG. 4B illustrate an example in which the primary server bridge is modifying the sequence numbers of the payload bytes. The segment that the primary server bridge just received contains the payload bytes with sequence numbers 51 to 54 as shown at block 110 in FIG. 4A, $\Delta_{seq}$ equals 30 as shown at block 112, and the primary server bridge had previously received a segment containing the payload bytes with sequence numbers 21 and 22 as shown at block 124 of FIG. 4B from the backup server. After the primary server bridge subtracts $\Delta_{seq}$ from the sequence numbers of the bytes it just received from the primary server TCP layer, it queues those bytes, which now have sequence numbers 21 to 24 as shown at block 114 of FIG. 4A, in the primary server output queue. Referring to FIG. 4B, the primary server bridge then receives a segment, sent by the backup server, that carries the payload bytes with sequence numbers 23 to 26 as shown at block 120. The primary server bridge finds and removes the matching bytes with sequence numbers 23 and 24 as shown at block 124 in the primary server output queue, dequeues the matching payload as shown at block 126, and creates a new TCP segment as shown at block 128 with those bytes in its payload 130 which it then passes to the IP layer. It queues the remaining bytes with sequence numbers 25 and 26 as shown at block 122 in the backup server output queue.

Figure 5:
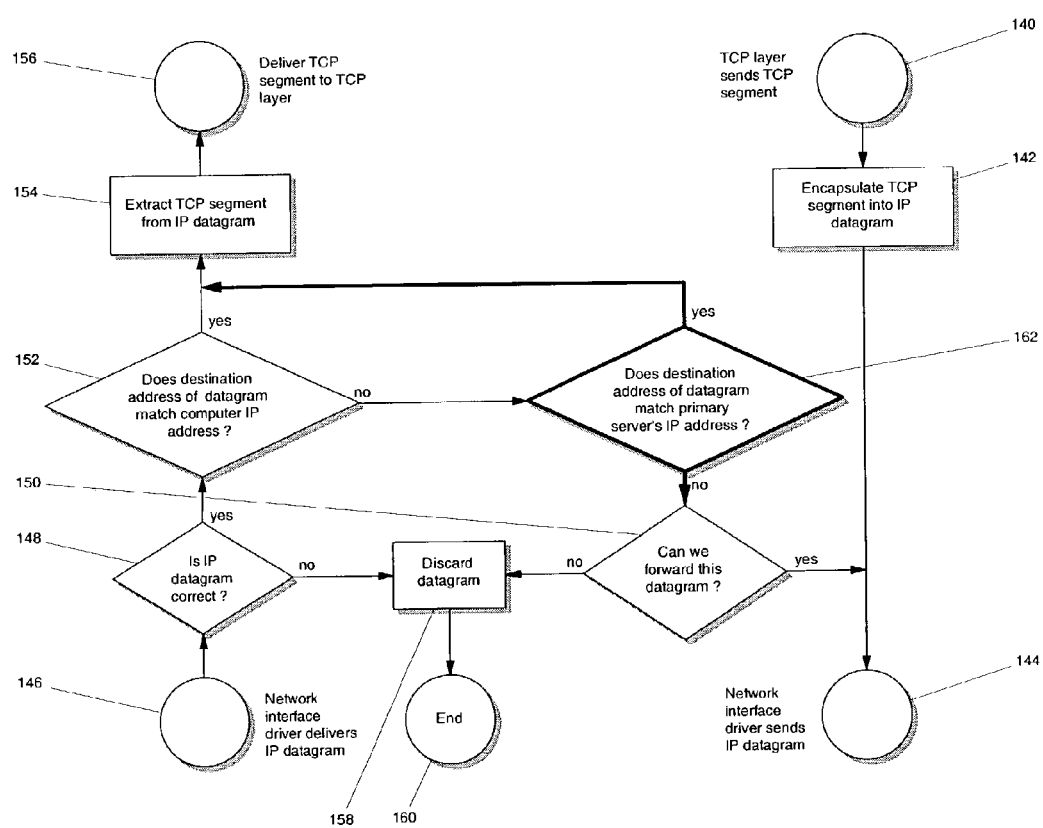
FIG. 5 is a flowchart of the IP layer of a TCP/IP protocol stack that implements TCP connection failover according to an aspect of the present invention.

FIG. 5 considered without block 162 and with a direct arrow from block 152 to block 150, illustrates the operation of the IP layer of a standard TCP/IP protocol stack. On sending a TCP segment, TCP passes the segment at block 140 to the IP layer together with the source address and the destination address of the segment. The IP layer encapsulates the segment into an IP datagram as per block 142, and then passes the datagram to the network interface driver as shown at block 144.

On receiving a message from the network, the network interface driver passes each IP datagram to the IP layer at block 146. The IP layer checks at block 148 for bit errors to see if the datagram is correct. If the datagram is corrupted, it discards the datagram at block 158 and terminates at block 160. The IP layer then compares at block 152 the destination address of the datagram with the IP addresses assigned to its computer. If the destination address does not match any of those IP addresses, the IP layer checks whether it has a route for the address and can forward the datagram as shown by block 150. If the IP layer has a route for the address, the IP layer passes the datagram back to the network interface driver; otherwise, it discards the datagram at block 158 and terminates at block 160. If the destination address matches one of those IP addresses, the IP layer extracts the TCP segment from the datagram at block 154 and delivers it to the TCP layer at block 156.

FIG. 5, with block 162 and the existing arrows, shows the IP layer of a TCP/IP protocol stack that implements TCP connection failover. The check in block 162 ensures that the backup server does not forward or discard IP datagrams addressed to the primary server. Instead, the backup server handles those datagrams just like datagrams that are addressed to the backup server. Otherwise, the steps are the same as those described above for FIG. 5 and a standard TCP/IP protocol stack.

Figure 6:
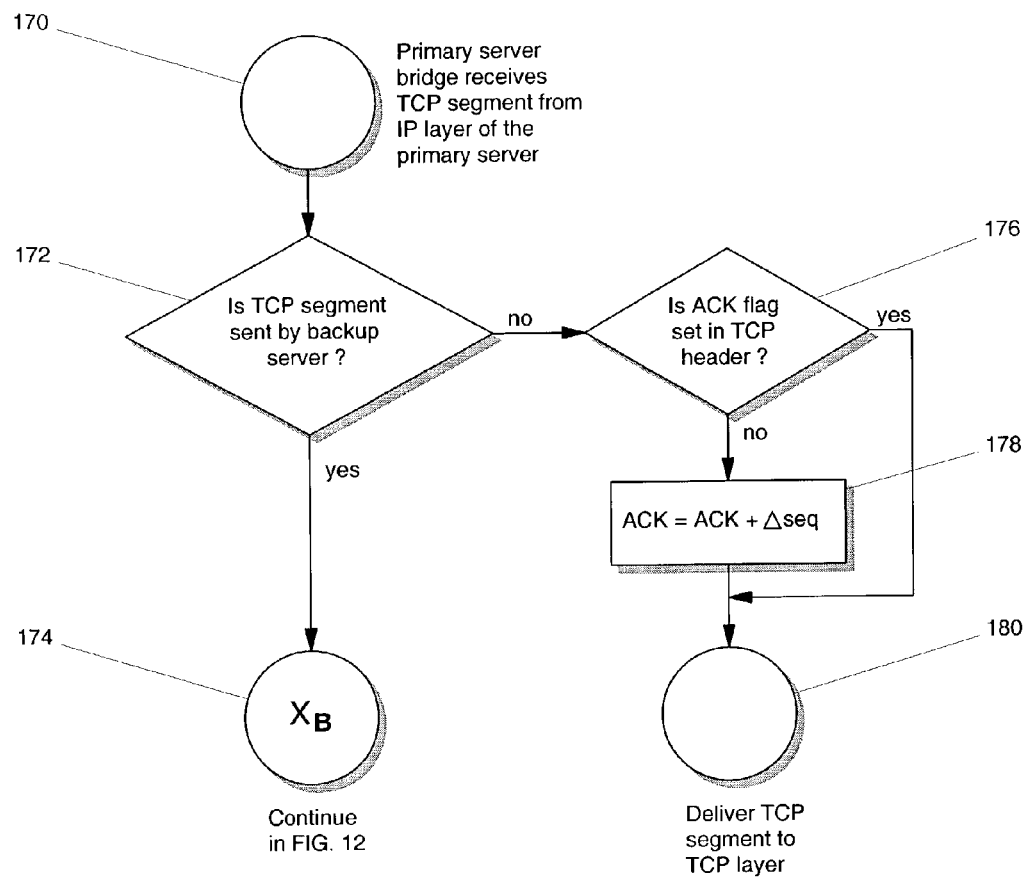
FIG. 6 is a flowchart of the primary server bridge receiving a TCP segment from the backup server according to an aspect of the present invention.

FIG. 6 is a diagram that shows the primary server bridge receiving at block 170 a TCP segment from the IP layer of the primary server. The bridge checks at block 172 whether the backup server sent the segment. If the backup server sent the segment, the bridge processes the SYN flag at block 174 with processing continuing in FIG. 12. If the backup server did not send the segment, the bridge checks at block 176 whether the ACK flag in the TCP header is set. If the ACK flag in the TCP header is not set, it sets ACK equal to the sum of ACK and $\Delta_{seq}$ at block 178. In either case, it then delivers the segment to the TCP layer at block 180.

Figure 7:
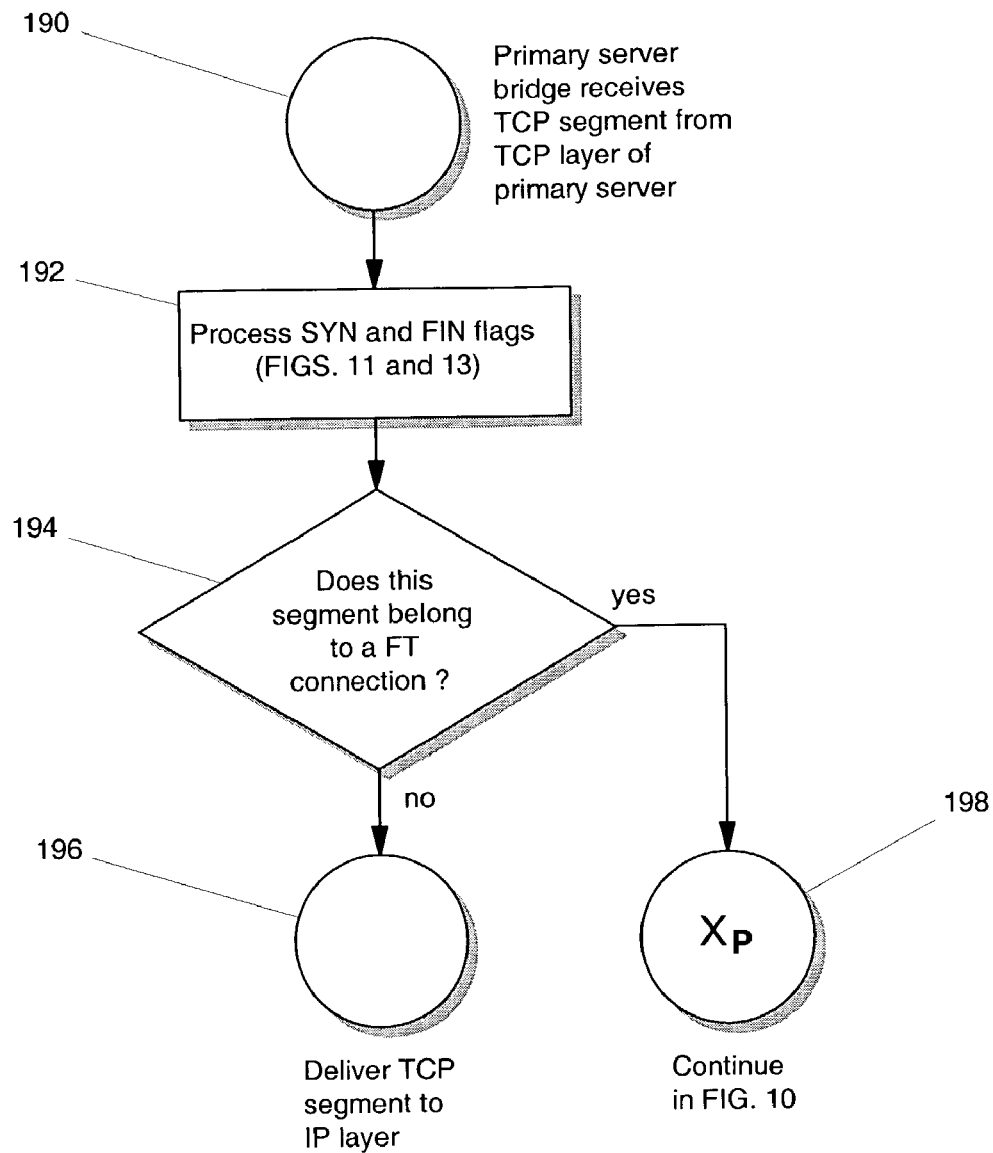
FIG. 7 is a flowchart of the primary server bridge receiving a TCP segment from the primary server's TCP layer according to an aspect of the present invention.

FIG. 7 is a diagram that shows the primary server bridge receiving at block 190 a TCP segment from the TCP layer of the primary server. The bridge processes the SYN flag and FIN flag at block 192, processing details are respectively described by the flowcharts of FIG. 11 and FIG. 13, and checks whether at block 194 the segment belongs to a FT connection. If the segment does not belong to a FT connection, the bridge passes the segment to the IP layer at block 196, which sends it to the client. If the segment belongs to a FT connection, the bridge delivers the segment to the core of the primary server bridge at block 198 which is shown continuing in FIG. 10.

Figure 8:
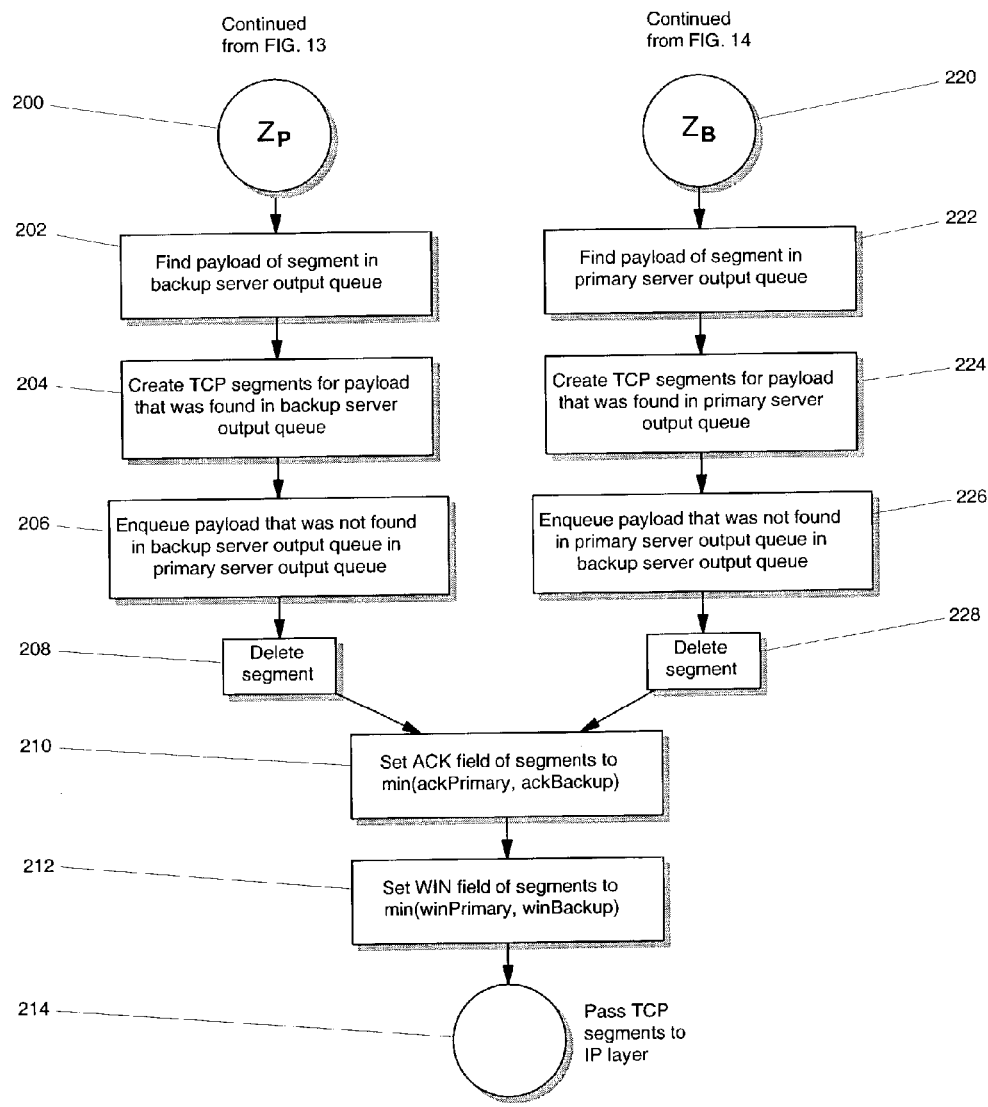
FIG. 8 is a flowchart of the primary server bridge sending a TCP segment to the client according to an aspect of the present invention.

FIG. 8 is a diagram that shows the core of the primary server bridge on receiving a TCP segment. If the core receives a TCP segment from the primary server's TCP layer at block 200, it matches the segment's payload against the data in the backup server output queue at block 202. The bridge creates at block 204 new TCP segments that contain the matching payload bytes using the adjusted sequence numbers from block 304 in FIG. 11. The bridge queues the remaining bytes of the original segment in the primary server output queue as represented by block 206 and deletes the original segment at block 208.

The new segments carry the address of the primary server in the source field and the address of the client in the destination field. The acknowledgment field is set at block 210 to the smaller of the acknowledgment sequence numbers of the last segment that the bridge received from the TCP layer of the primary server or the backup server. The same procedure is used to fill the window size field of the new segments at block 212. The segments are then passed to the IP layer at block 214, which sends them to the client.

If the core receives a TCP segment from the backup server as represented by block 220, it matches the segment's payload data against the data in the primary server output queue at block 222. The bridge creates new TCP segments at block 224 that contain the matching payload bytes. It queues the remaining bytes of the original segment in the backup server output queue at block 226 and deletes the original segment at block 228. The remainder of the procedure comprises steps represented by blocks 210, 212 and 214, as described above.

Figure 9:
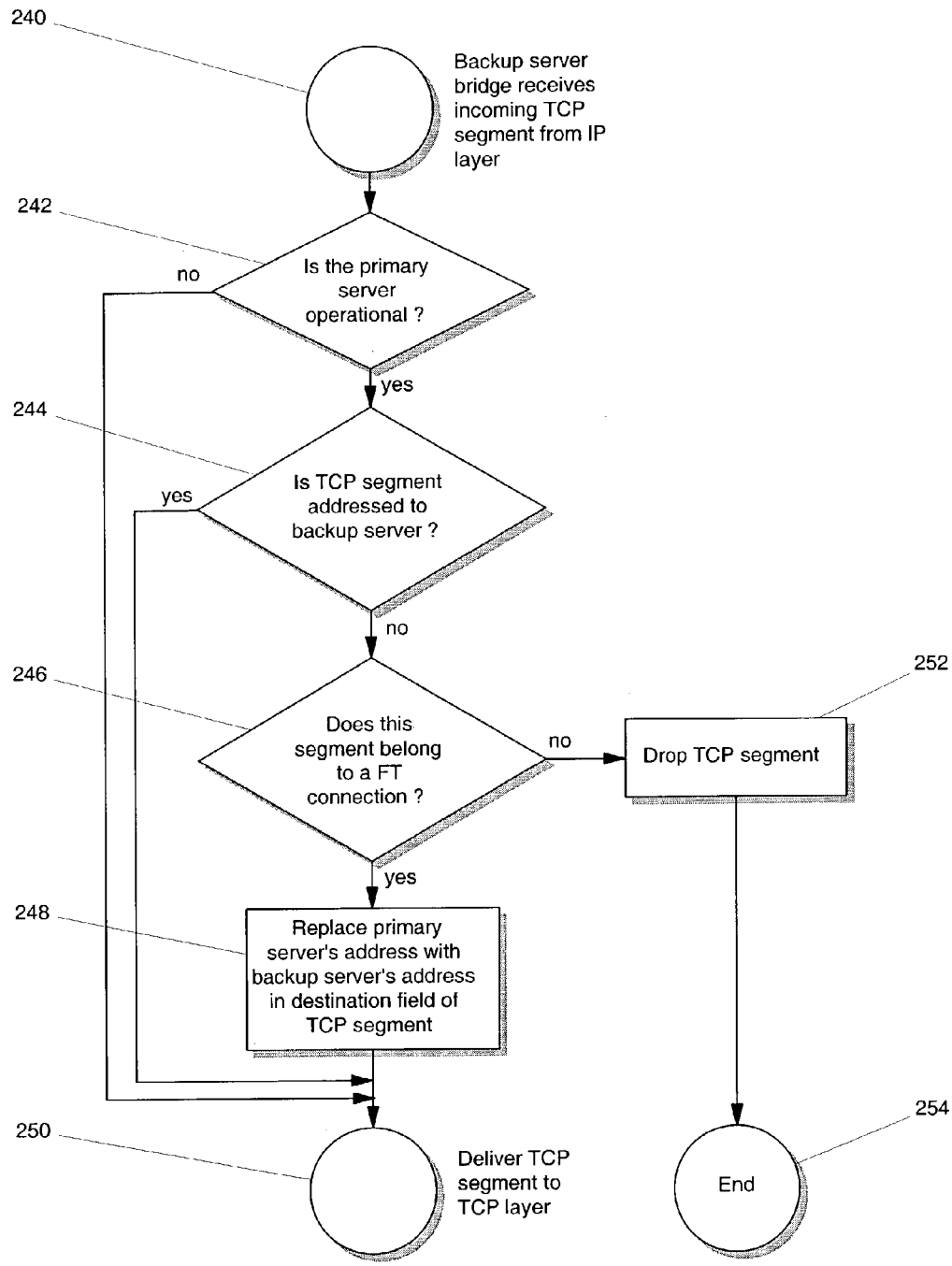
FIG. 9 is a flowchart of the backup server bridge receiving an incoming TCP segment from the IP layer according to an aspect of the present invention.

FIG. 9 is a diagram that shows the backup server bridge receiving an incoming TCP segment from the IP layer at block 240. First, it checks at block 242 whether the primary server is operational. If the primary server is not operational, the bridge delivers the incoming segment to the IP layer at block 250. If the primary server is operational, the bridge checks whether the incoming TCP segment is addressed to the backup server at block 244. If the incoming TCP segment is addressed to the backup server, the bridge passes the segment as per block 250 to the TCP layer. If the incoming TCP segment is not addressed to the backup server, the bridge checks whether the segment belongs to a FT connection at block 246. If the segment belongs to a FT connection, the bridge overwrites the destination address of the segment with the address of the backup server at block 248, and then passes at block 250 the segment to the TCP layer. If the segment does not belong to a FT connection, the bridge drops the segment 252.

Figure 10:
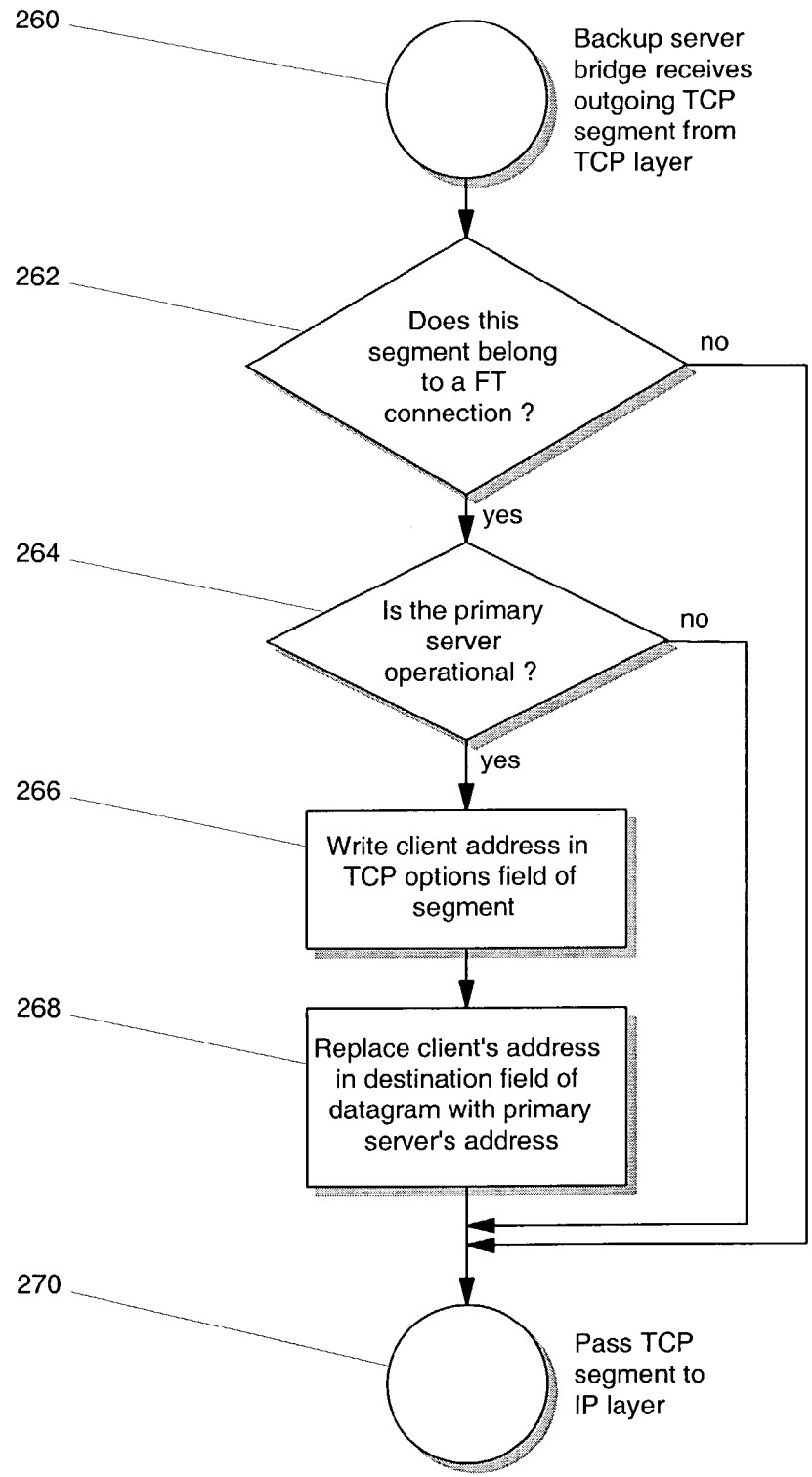
FIG. 10 is a flowchart of the backup server bridge receiving an outgoing TCP segment from the TCP layer according to an aspect of the present invention.

FIG. 10 is a diagram that shows the backup server bridge receiving at block 260 an outgoing TCP segment from the TCP layer. First, the bridge checks at block 262 whether the segment belongs to a FT connection. If the segment does not belong to a FT connection, the bridge passes the segment to the IP layer at block 270. If the segment belongs to a FT connection, the bridge checks at block 264 whether the primary server is operational. If the primary server is not operational, the bridge passes the segment to the IP layer at block 270. If the primary server is operational, the bridge writes the client address into the TCP options field of the segment at block 266 and overwrites the client address in the destination field of the segment with the address of the primary server at block 268. The bridge then passes the segment to the IP layer at block 270, which sends the segment to the primary server.

Figure 11:
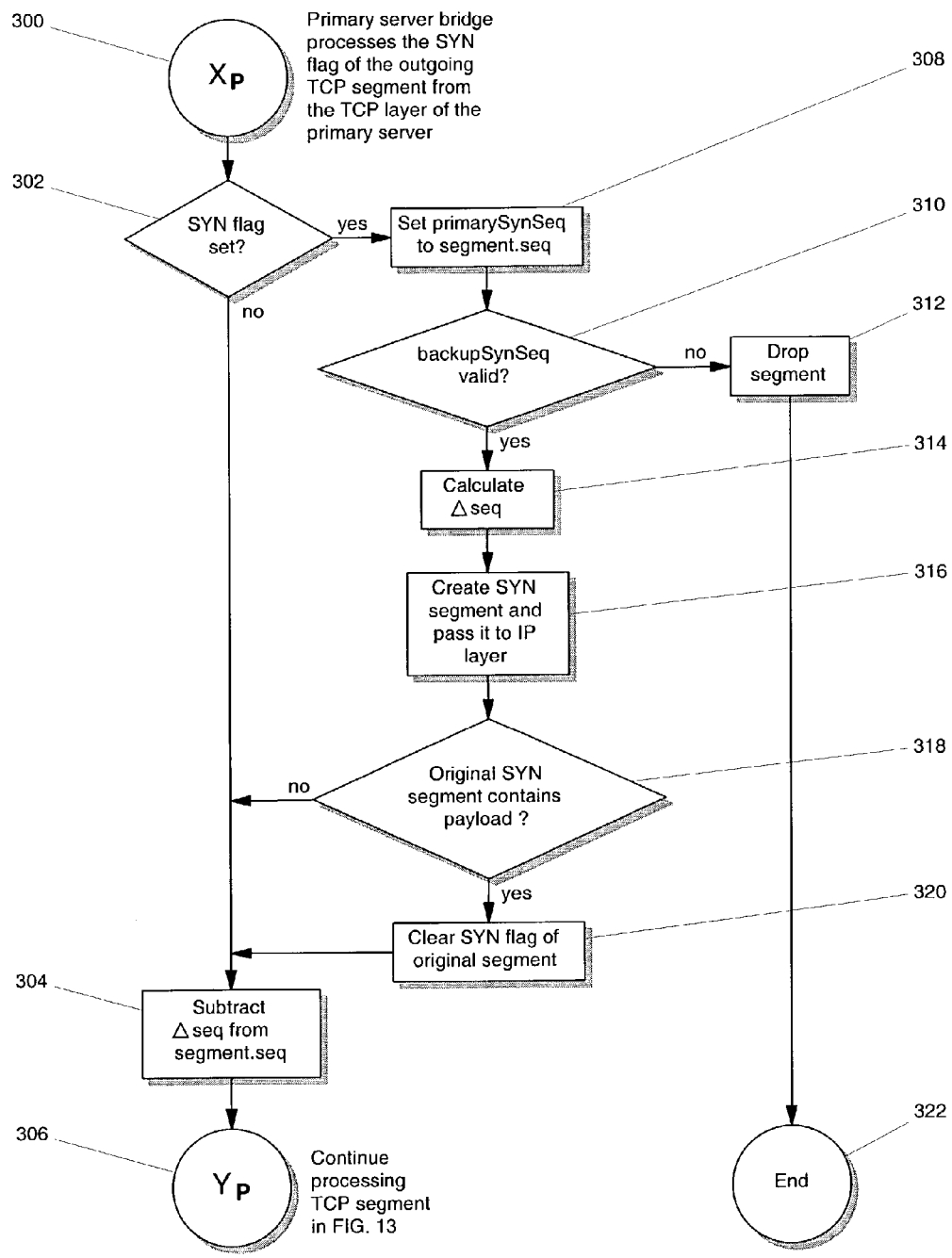
FIG. 11 is a flowchart of the primary server bridge processing the TCP SYN flags of segments that it receives from the primary server's TCP layer according to an aspect of the present invention.

FIG. 11 is a diagram that illustrates the primary server bridge processing the SYN flags of segments that the bridge receives from the TCP layer as per block 300. The bridge checks whether the SYN flag is set at block 302. If the SYN flag is not set, the bridge subtracts the value of the variable seqOffset from the sequence number of the segment at block 304 and continues to process the TCP segment at block 306. If the SYN flag is set, the bridge sets the value of the variable primarySynSeq equal to the sequence number of the TCP segment at block 308.

If the variable backupSynSeq does not contain a valid sequence number at block 310, the bridge drops the segment at block 312 and terminates at block 322. Otherwise, the bridge calculates the value of the variable seqOffset at block 314. It then creates at block 316 a new SYN segment without any payload and with a sequence number equal to that of the original SYN segment minus seqOffset, and passes the new SYN segment to the IP layer at block 316, which sends the new SYN segment to the client.

The bridge then checks at block 318 whether the original SYN segment contains any payload. If the original SYN segment contains payload, the bridge clears the SYN flag of the segment at block 320. In either case, the bridge then subtracts at block 304 seqOffset from segment.seq and continues processing at block 306 as if the segment were a regular segment sent by the primary server's TCP layer.

Figure 12:
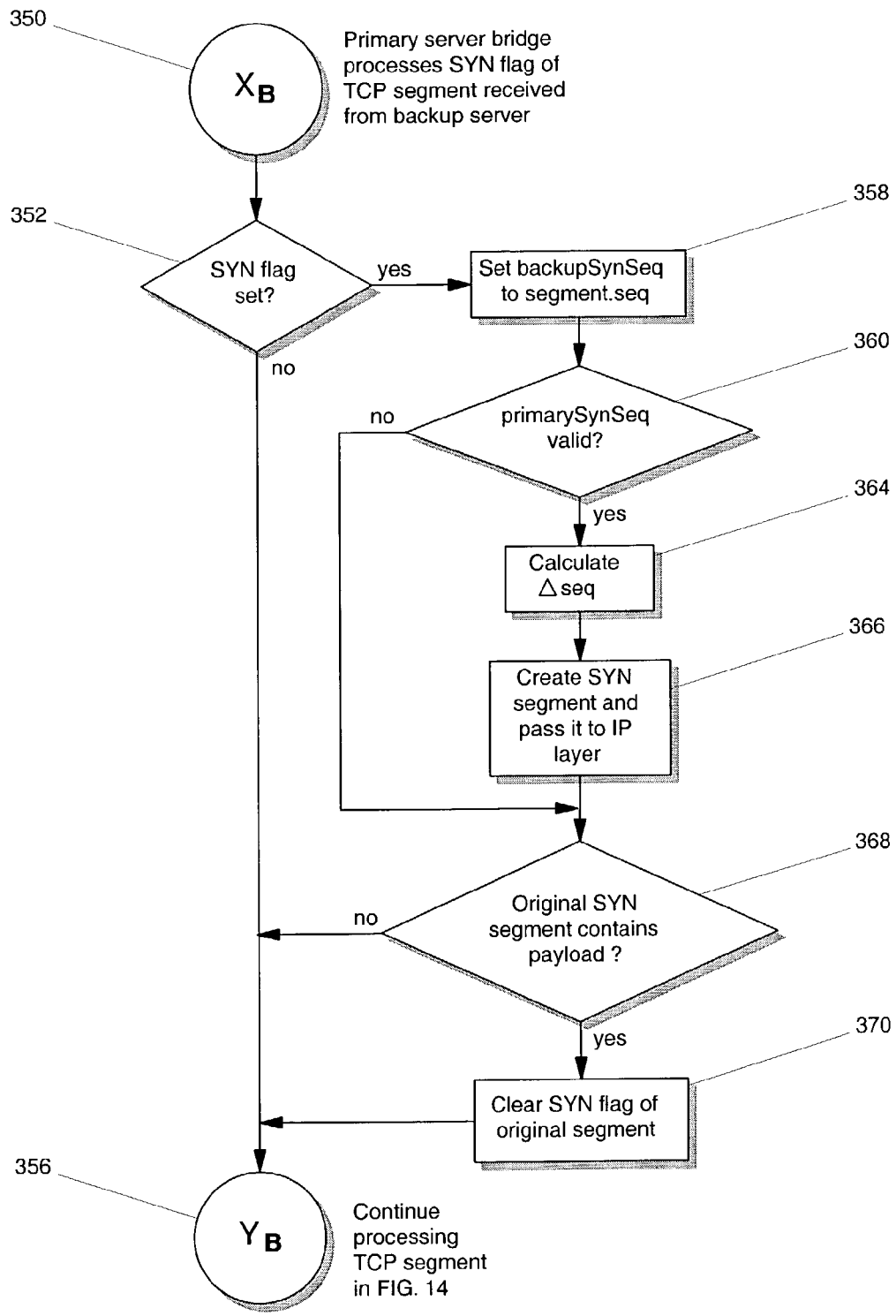
FIG. 12 is a flowchart of the primary server bridge processing the TCP SYN flags of segments that it receives from the backup server according to an aspect of the present invention.

FIG. 12 is a diagram illustrating primary bridge processing of the SYN flag of a TCP segment that the bridge received from the backup server as represented by block 350. The bridge checks whether the SYN flag is set at block 352. If the SYN flag is not set, the bridge continues to process the segment at block 356. If the SYN flag is set, the bridge sets the value of the variable backupSynSeq, at block 358, to the sequence number carried by the segment.

If the variable primarySynSeq does not contain a valid sequence number 360, the bridge then checks whether the original SYN segment contains any payload at block 368, and if the segment contains a payload the bridge clears the SYN flag of the original segment at block 370 and continues to process the segment at block 356. Otherwise, the bridge calculates the value of the variable seqOffset 364. It then creates a SYN segment, without any payload and with a sequence number equal to the sequence number of the original SYN segment minus seqOffset, and passes it to the IP layer at block 366. The IP layer sends the SYN segment to the client.

The bridge then checks whether the original SYN segment contains any payload at block 368. If the original SYN segment contains payload, the bridge clears the SYN flag of the segment at block 370. In either case, the bridge then handles the segment like a regular segment sent by the primary server's TCP layer as represented by block 356.

Figure 13:
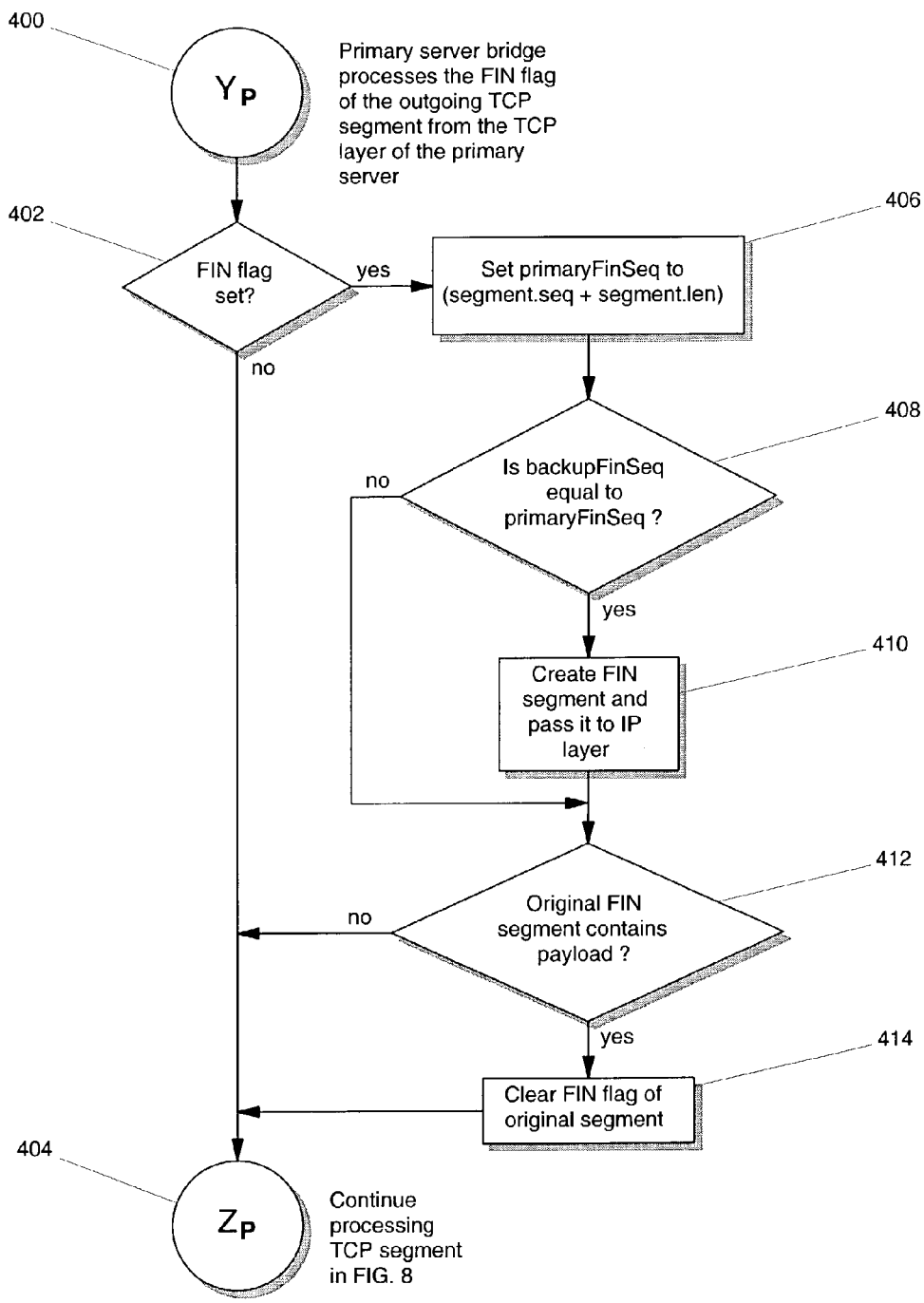
FIG. 13 is a flowchart of the primary server bridge processing the TCP FIN flags of segments that it receives from the primary server's TCP layer according to an aspect of the present invention.

FIG. 13 is a diagram that illustrates the primary server bridge processing a TCP FIN flag of a segment that it received from the TCP layer of the primary server at block 400. The bridge checks at block 402 whether the FIN flag is set. If the FIN flag is not set, the bridge continues to process the segment in FIG. 8 like a regular segment sent by the primary server's TCP layer as represented by block 404. If the FIN flag is set, the bridge sets the value of the variable primaryFinSeq at block 406 to the sequence number of the last byte of the TCP segment.

The primary server bridge then checks at block 408 whether the value of the variable backupFinSeq is equal to the value of the variable primaryFinSeq. If the value of backupFinSeq is not equal to the value of primaryFinSeq, the bridge checks whether the original FIN segment contains payload at block 412. If the original FIN segment contains payload, the bridge clears the FIN flag of the segment at block 414. In either case, the bridge continues processing the segment as represented by block 404.

If the value of backupFinSeq is equal to the value of primaryFinSeq, the bridge creates a FIN segment, without any payload and with sequence number equal to primaryFinSeq, and passes the new FIN segment to the IP layer at block 410, which sends the FIN segment to the client. The primary server bridge then checks at block 412 whether the original FIN segment contains any payload. If the original FIN segment contains payload, the bridge clears the FIN flag of the segment at block 414. In either case, the bridge then continues processing the segment like a regular segment sent by the primary server's TCP layer as represented by block 404.

Figure 14:
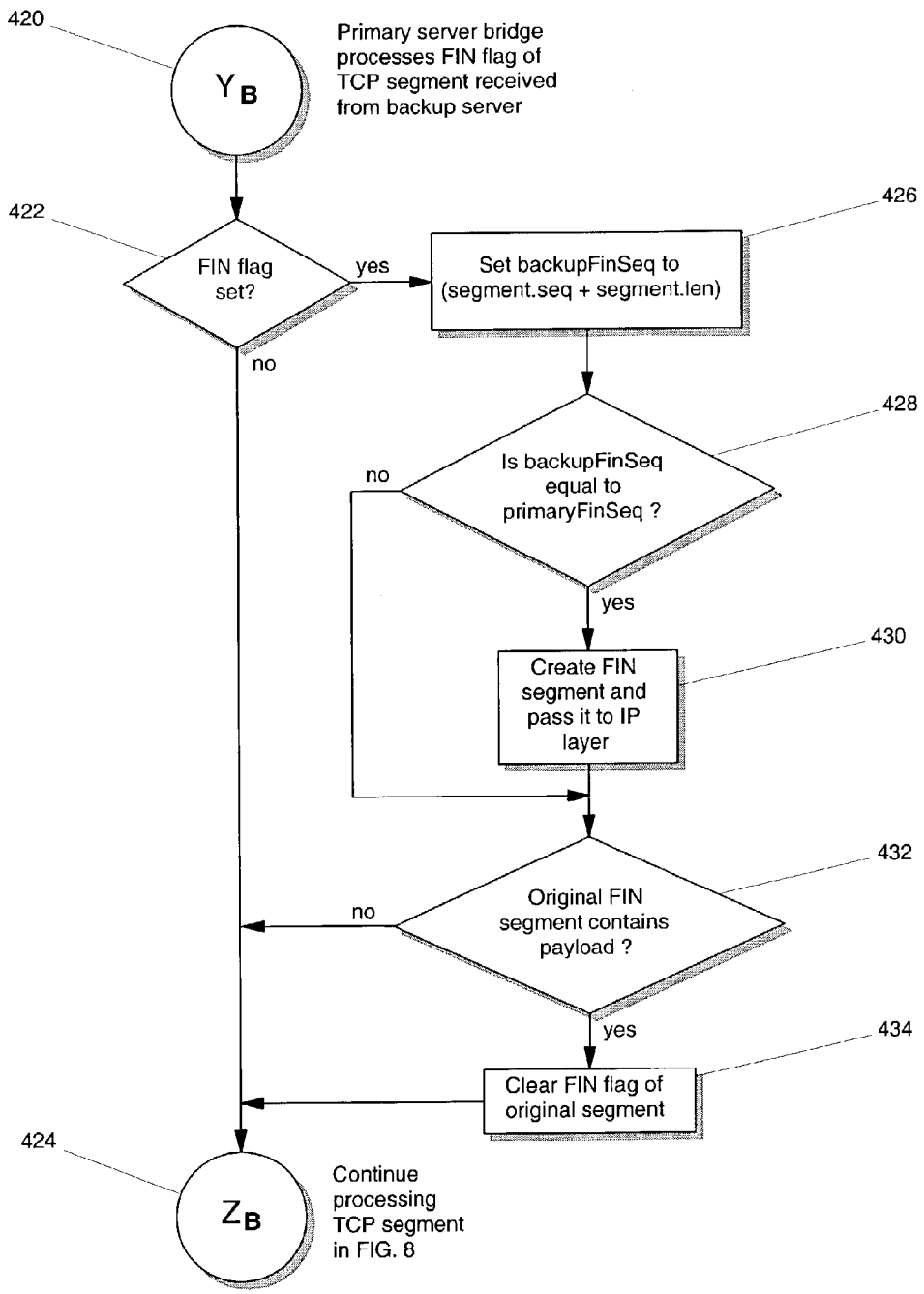
FIG. 14 is a flowchart of the primary server bridge processing the TCP FIN flags of segments that it receives from the backup server according to an aspect of the present invention.

FIG. 14 is a diagram that shows the primary server bridge processing a TCP FIN flag of a segment that it received from the backup server as represented by block 420. The bridge checks whether the FIN flag is set at block 422. If the FIN flag is not set, the bridge continues to process the segment as represented by block 424. If the FIN flag is set, the bridge sets the value of the variable backupFinSeq at block 426 to the sequence number of the last byte of the TCP segment.

The backup server bridge then checks whether the value of the variable backupFinSeq is equal to the value of the variable primaryFinSeq at block 428. If the value of backupFinSeq is not equal to the value of primaryFinSeq, it checks whether the original FIN segment contains any payload at block 432. If the original FIN segment contains payload, the bridge clears the FIN flag of the segment at block 434. In either case, it then continues to process the segment as represented by block 424.

If the value of backupFinSeq is equal to the value of primaryFinSeq, the bridge creates a FIN segment, without any payload and with sequence number equal to primaryFinSeq, and passes at block 430 the new FIN segment to the IP layer, which sends the FIN segment to the client. The backup server bridge then checks at block 432 whether the original FIN segment contains any payload. If the original FIN segment contains payload, the bridge clears the FIN flag of the segment at block 434. In either case, the bridge then continues processing the segment like a regular segment sent by the primary server's TCP layer as represented by block 424.

Figure 15:
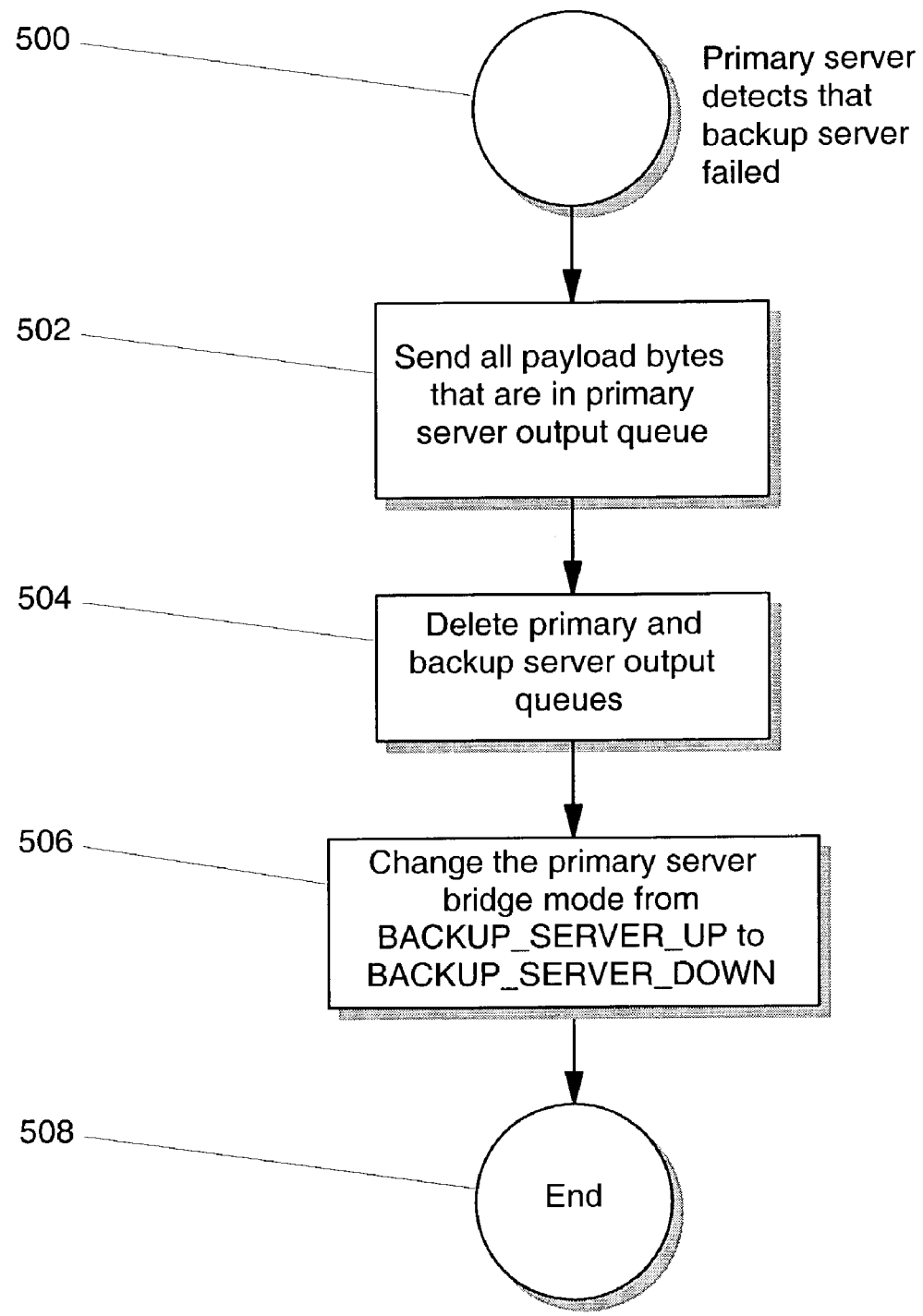
FIG. 15 is a flowchart of steps taken by the primary server bridge when the primary server detects that the backup server is faulty according to an aspect of the present invention.

FIG. 15 is a diagram that shows the steps taken by the primary server bridge when the primary server detects at block 500 that the backup server has failed. The primary server bridge sends at block 502 all payload data that are in the primary server output queue. It then deletes the primary server output queue and the backup server output queue at block 504 and changes the primary server bridge mode from BACKUP_SERVER_UP to BACKUP_SERVER_DOWN at block 506, and the process terminates at block 508.

Figure 16:
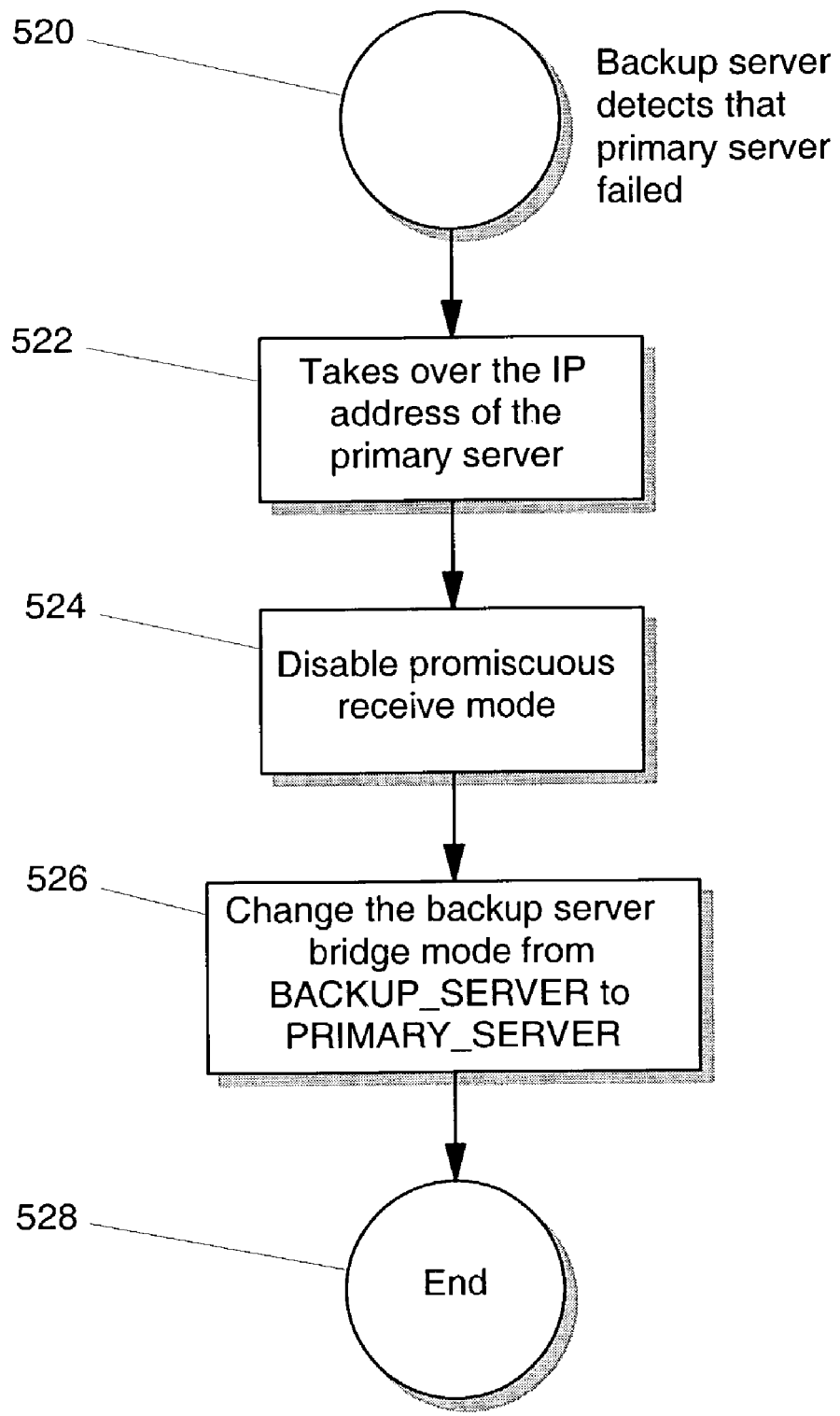
FIG. 16 is a flowchart of steps taken by the backup server bridge when the backup server detects that the primary server is faulty according to an aspect of the present invention.

FIG. 16 is a diagram that shows the steps taken by the backup server bridge when the backup server detects that the primary server has failed as represented by block 520. The backup server takes over the IP address of the primary server at block 522, disables the promiscuous receive mode at block 524 and then changes the backup server bridge mode from BACKUP_SERVER to PRIMARY_SERVER at block 526, and the process terminates at block 528.

Figure 17:
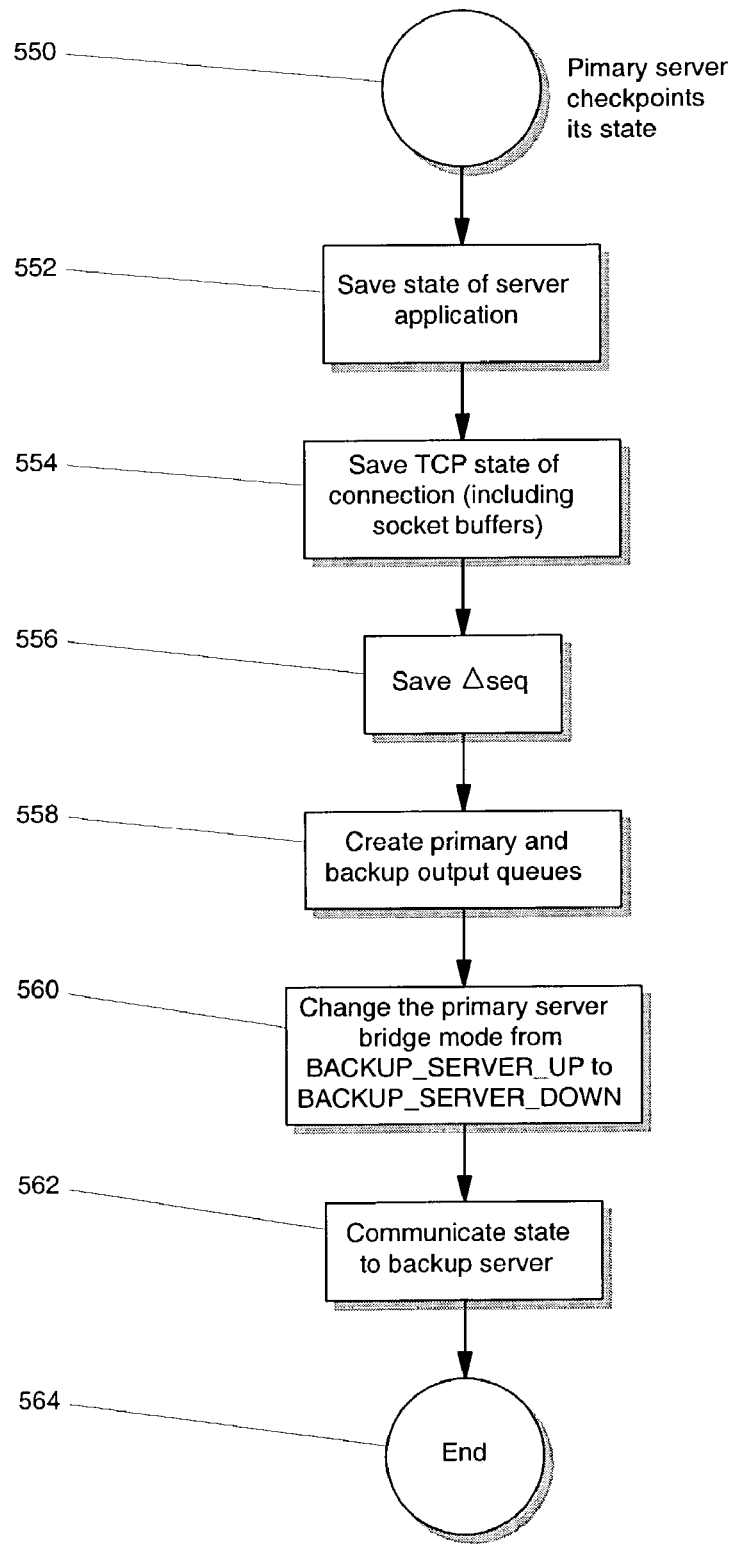
FIG. 17 is a flowchart of steps taken at the primary server to bring up a new backup server according to an aspect of the present invention.

FIG. 17 is a diagram that shows the steps taken at the primary server to bring up a new backup server. The primary server checkpoints its state at block 550 by performing the following operations. The primary server captures the state of the server application at block 552 and the state of the fault-tolerant connections that the server application currently uses, including the socket buffer state at block 554. It saves the sequence number offset of all fault-tolerant connections at block 556. The primary server prepares the primary server bridge to collaborate with the backup server by creating the backup server output queue and initializing the data structures and variables at block 558. The above operations must be executed atomically. The primary server then changes the primary server bridge mode from BACKUP_SERVER_DOWN to BACKUP_SERVER_UP at block 560, and communicates state to the backup server at block 562, and the process terminates at block 564. Subsequently, the primary server bridge sends TCP segments to the client only if it has received the corresponding segments from the primary server TCP layer and the backup server.

Figure 18:
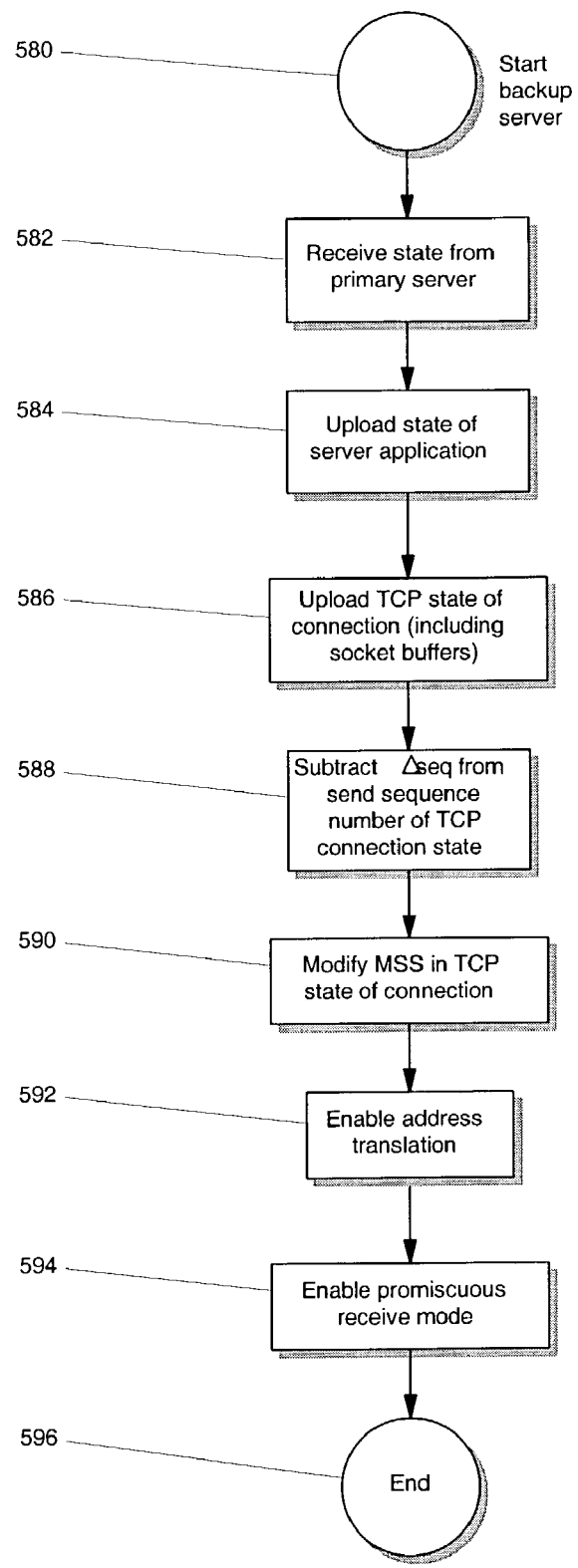
FIG. 18 is a flowchart of steps taken at a new backup server to bring up that new backup server according to an aspect of the present invention.

FIG. 18 is a diagram that shows the steps that are taken at a new backup server to start the new backup server as represented by block 580. The backup server receives state from the primary server at block 582. The backup server starts the server application and uploads the server application state at block 584. It creates the ongoing fault-tolerant connections by uploading at block 586 the state of the TCP layer for those connections, including the socket buffers. It modifies the sequence number of all outgoing TCP segments (subtracts seqOffset) at block 588. It modifies the Maximum Message Size (MSS) for all established connections that the server applications maintain, which ensures that the segments provide enough space to attach the original client address to the TCP header at block 590. It enables address translation at block 592, and enables promiscuous receive mode at block 594, and the process terminates at block 596. The above operations at the backup server must be executed atomically.

Accordingly, it will be seen that this invention of a method and system for maintaining a connection and providing transparent connection failover can be implemented with numerous variations obvious to those skilled in the art. It should be appreciated that the bridge routines, and other routines and elements described herein may be implemented with variations as to structure, order, sequence and optional aspects, without departing from the teachings of the present invention. It should also be appreciated that described aspects of the invention need not be implemented in each application which follows the teachings herein, while heretofore undescribed options may be implemented along with the teachings herein without departing from those teachings.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for providing transparent connection failover, comprising:
   a first server computer and one or more second server computers executing the same server application and configured for executing communication routines for communicating over a network; and
   means for migrating the connection endpoint of the server, within said communication routines on said computer servers upon the failure of said first server computer which is replying to requests from a client, so that said one or more second server computers begins replying to requests from said client without said client changing the connection endpoint address of the server from said first server computer to said one or more second server computers;
   wherein said communication routines are executing a connection-oriented communication protocol over an underlying network communication protocol that carries data over said network:
   wherein said means of migrating connection endpoint within said communication routines comprises a bridqe layer in said first server computer and in said one or more second server computers between said connection-oriented protocol and said underlying network communication protocol.

2. An apparatus as recited in claim 1, wherein said means of migrating the connection endpoint maintains synchronization between said one or more second server computers and said first server computer.

3. An apparatus as recited in claim 2, wherein said synchronization is maintained between said one or more second server computers and said first server computer, prior to a failure of said first server computer, by executing on said one or more second server computers the same request that are being executed on said first server computer.

4. An apparatus as recited in claim 1, wherein said first server computer and said one or more second server computers comprise a primary server being addressed by said client and one or more backup servers being maintained in synchronization with said primary server while said primary server is operational.

5. An apparatus as recited in claim 4, wherein said bridge layer in said primary server comprises a primary server output queue and a backup server output queue maintained by bridge routines within said bridge layer.

6. An apparatus as recited in claim 5, wherein said connection-oriented protocol comprises the Transmission Control Protocol (TCP) and said network communication protocol comprises the Internet Protocol (IP).

7. An apparatus as recited in claim 6, wherein said bridge layer modifies the Transmission Control Protocol (TCP) sequence numbers in the TCP segments so as to maintain synchronization between said first server computer and said one or more second server computers.

8. An apparatus for providing fault tolerance and transparent connection failover, comprising:
   a computer server configured for executing communication protocols with client computers over a network; and
   programming within said computer server for executing said communication protocols for
   communicating requests from a client to a primary server over said network,
   communicating requests from a client to at least one backup server over said network, where said backup server runs the same application program and performs the same operations in the application program as said primary server,
   communicating responses from said primary server to said client, and
   migrating the connection endpoint from said primary server to said backup server in response to the failure of said primary server;
   wherein said backup server receives and processes said client requests without said client changing the endpoint address of the server from said primary server to said backup server, so that connection endpoint migration is transparent to said client;
   wherein said communication orotocols comprise a connection-oriented communication protocol executing over a network communication protocol;
   wherein said programming is executed as bridge routines in a bridge sublayer, positioned between said connection-oriented communication protocol layer and said network communication protocol layer, said bridge routines configured for migrating the connection endpoint from said primary server to said backup server.

9. An apparatus as recited in claim 7, further comprising programming configured for communicating client requests to said backup server to maintain synchronization of said backup server with said primary server.

10. An apparatus as recited in claim 9, wherein said primary server and said backup server undergo identical state transitions in the application, eliminating the need for transfer of application state to achieve transparent connection failover.

11. An apparatus as recited in claim 8, further comprising programming configured for transferring the application state and the state of communication protocols upon bringing up a new backup server replica, or returning a failed and repaired server replica to service.

12. An apparatus as recited in claim 10, wherein said connection-oriented protocol comprises the Transmission Control Protocol (TCP) and said network communication protocol comprises the Internet Protocol (IP).

13. An apparatus as recited in claim 8, further comprising a primary server output queue and a backup server output queue maintained within said bridge layer for each fault-tolerant connection that is to be maintained between said client and said server.

14. An apparatus as recited in claim 8, further comprising programming within said bridge layer configured for adjusting the sequence numbers of outgoing segments, and acknowledgments for incoming segments, as received by said primary server from said connection-oriented communication protocol.

15. An apparatus as recited in claim 8, further comprising programming within said bridge layer configured for acknowledging a connection-oriented communication protocol segment from said client only after receiving an acknowledgment of that segment from said backup server.

16. An apparatus as recited in claim 8, further comprising programming within said bridge layer configured for maintaining a copy, on said backup server, of connection-oriented communication protocol segments, identical to the segments sent by said primary server, that have not been acknowledged by said client.

17. An apparatus as recited in claim 16, wherein said bridge routines are configured to remove a given connection-oriented communication protocol segment from the buffers maintained within said primary server and said backup server in response to acknowledgment by said client of said given connection-oriented protocol segment.

18. An apparatus as recited in claim 8:
   wherein said bridge routines within said backup server are configured with programming for
      replacing the original destination address of an outgoing segment, the client address, with the address of said primary server,
      maintaining said client address from said outgoing message in an options field of said connection-oriented communication protocol, and
      replacing the original destination address of an incoming segment, the primary server address, with the address of said backup server.

19. An apparatus as recited in claim 18, wherein said backup server is configured to operate on said network in a promiscuous mode in which it receives all datagrams from said client computer.

20. An apparatus as recited in claim 19:
   wherein said connection-oriented communication protocol comprises the Transmission Control Protocol (TCP) and said network communication protocol comprises the Internet Protocol (IP);
   wherein said backup server bridge discards the payload of any datagram not containing a Transmission Control Protocol (TCP) segment, or that is not addressed to said primary server;
   wherein said backup server bridge replaces the original destination field with the address of said backup server within the Transmission Control Protocol (TCP) segment header and passes said TOP segment to said TOP layer of said backup server; and
   wherein upon said backup server processing said Transmission Control Protocol (TCP) segment, said TOP layer of said backup server assumes that said client sent said segment directly to said backup server.

21. An apparatus as recited in claim 20:
   wherein upon said primary server bridge receiving a Transmission Control Protocol (TCP) segment that said backup server sent, it matches the Transmission Control Protocol (TCP) segment's payload data of said segment against the data in said primary server output queue and builds a new Transmission Control Protocol (TCP) segment containing the matching payload bytes; and
   wherein the new Transmission Control Protocol (TCP) segment carries the address of said primary server in the source field and the address of said client in the destination field.

22. An apparatus as recited in claim 20:
wherein said backup server sends a Transmission Control Protocol (TCP) segment that does not contain the data bytes from the application program on said backup server;
wherein upon said primary server bridge receiving a Transmission Control Protocol (TCP) segment that said backup server sent, it matches the sequence numbers against the sequence numbers in said primary server output queue and builds a new Transmission Control Protocol (TCP) segment containing data bytes from said primary server output queue corresponding to the matching sequence numbers; and
wherein the new Transmission Control Protocol (TCP) segment carries the address of said primary server in the source field and the address of said client in the destination field.

23. A method of ensuring transparent connection failover within a network, comprising:
executing communication routines on computers connected in said network so that computations can be executed on a first computer in response to communication with a remote computer;
maintaining synchronization of at least a second computer with said first computer, within said communication routines, wherein said second computer executes the same said computations as said first computer; and
migrating the connection endpoint, within said communication routines, from said first computer to said second computer in response to the failure of said first computer, providing transparent connection failover so that said remote computer still addresses said first computer but communicates with said second computer, and said remote computer is unaware of said server failure or of said connection failover;
wherein said communication routines comprise routines for executing a connection-oriented communication protocol over a network communication protocol; and
wherein said migrating connection endpoints is performed within bridge routines, within said communication routines, that execute in a bridge sublayer between said connection-oriented communication protocol layer and said network communication protocol layer.

24. A method as recited in claim 23, wherein said first computer and said second computer are configured for executing the same server application for performing said computations.

25. A method as recited in claim 24, wherein said server application is replicated on both said first and said second computers using active or semi-active replication.

26. A method as recited in claim 25, wherein said first computer and said second computer comprise a primary server and a backup server.

27. A method as recited in claim 26, wherein said remote computer comprises a client of said server.

28. A method as recited in claim 27, wherein said communication routines are configured to maintain communication between said client and one of said servers in response to at least one of said servers remaining operational.

29. A method as recited in claim 26, wherein said communication routines for said primary server and said backup are configured so that said server application undergoes identical state transitions eliminating the need to transfer application state in order to achieve transparent connection failover.

30. A method as recited in claim 26:
wherein said communication routines are configured for bringing up a new backup server, or returning a failed and repaired server to the system by executing a state transfer to said new backup server; and
wherein the application state and the communication infrastructure state are transferred in said state transfer.

31. A method as recited in claim 23:
wherein said bridge routines comprise primary server bridge routines and backup server bridge routines;
wherein said first computer and said second computer comprise a primary server and a backup server; and
wherein said remote computer comprises a client of said servers.

32. A method as recited in claim 31, further comprising maintaining a primary server output queue and a backup server output queue within said primary server bridge routines.

33. A method as recited in claim 32, wherein said primary server output queue and said backup server output queue are maintained for each fault-tolerant connection between said client and said servers.

34. A method as recited in claim 32, further comprising maintaining payload bytes in said primary server output queue within said primary server bridge, generated by said primary server's connection-oriented communication protocol layer.

35. A method as recited in claim 32, further comprising maintaining payload bytes in said backup server output queue within said primary server bridge, where said bytes were communicated by said backup server to said primary server.

36. A method as recited in claim 35, wherein said communication routines for said primary server are configured to postpone acknowledging a client's connection-oriented protocol segment until said primary server has received an acknowledgment of that segment from said backup server.

37. A method as recited in claim 36, wherein said communication routines for said backup server are configured for maintaining a copy of all connection-oriented protocol segments sent by said primary server to said client that said client has not acknowledged.

38. A method as recited in claim 32, wherein said communication routines for said primary server and said backup server are configured for removing said connection-oriented segment from said queues in response to receiving an acknowledgment of receipt of a connection-oriented segment by said client.

39. A method as recited in claim 31, wherein said bridge routines are configured to synchronize the connection-oriented protocol sequence numbers utilized by said primary server and said backup server.

40. A method as recited in claim 31, wherein said communication routines are configured to modify the connection endpoint address, from said primary server to said backup server, in response to the failure of said primary server, so that said client need not establish a new connection with said backup server.

41. A method as recited in claim 31, wherein said communication routines for said backup server are configured to stay within the Maximum Segment Size (MSS) and the maximum window size that were previously negotiated between said primary server and said client when establishing the connection.

42. A method as recited in claim 23, wherein said bridge routines are configured to generate between k+1 and 2k messages for a request, reply, or acknowledgment, in which k represents the number of server replicas.

43. A method as recited in claim 23, wherein said bridge routines are configured for performing said synchronization and said connection endpoint migration without proxies or communication routines in user space at each server.

44. A method as recited in claim 23, wherein said bridge routines are configured to perform said transparent connection failover without modifying network infrastructure, the server application, the client application, or the Transmission Control Protocol (TCP) layer or Internet Protocol (IP) layer of the TCP/IP stack of said client.

45. A method as recited in claim 23, wherein said bridge routines are configured for providing said transparent connection failover without replaying the entire history of the connection between said client and said primary server.

46. A method as recited in claim 23, wherein said bridge routines are configured to perform said transparent connection failover without modifying the Transmission Control Protocol (TCP) layer or the Internet Protocol (IP) layer of said server and without modifying the software or hardware of said client.

47. A method as recited in claim 23, wherein said bridge routines are configured to perform said transparent connection failover without requiring said backup server to change its Internet Protocol (IP) address to the address of the primary server and to send a gratuitous Address Resolution Protocol (ARP) request to announce that it can now be found at the Internet Protocol (IP) address of said primary server.

48. A method as recited in claim 23, wherein said bridge routines are configured to perform said transparent connection failover without requiring said client to establish a network connection with a dispatcher configured for routing all traffic from said client.

49. A method as recited in claim 23, wherein said bridge routines are configured to perform said transparent connection failover without utilizing a front-end layer-4 switch configured to route the packets to the appropriate server.

50. A method as recited in claim 23, wherein said bridge routines are configured to perform said transparent connection failover without preventing multicasting or forwarding of messages from said client.

51. A method as recited in claim 23, wherein said bridge routines are configured to perform said transparent connection failover without the need for primary and backup servers to be operational and cooperating during the transparent connection failover after the failure of the primary server.

52. A method as recited in claim 23, wherein said bridge routines are configured to perform said transparent connection failover without forcing all traffic to pass through a traffic redirector within a network router.

53. A method as recited in claim 23, wherein said bridge routines are configured to perform said transparent connection failover without performing context switches or protocol stack traversals in user space.

54. A method of providing fault tolerance for two or more computers that communicate with a remote computer over a network connection and of providing transparent connection failover, comprising:
   executing the same computations of same server application on said two or more computers in response to communication from a remote computer;
   using the Transmission Control Protocol (TCP) over the Internet Protocol (IP); and
   migrating the connection endpoint of one of said two or more computers upon the failure of that computer wherein the other of said two or more computers continues to communicate with said remote computer;
   wherein routines for maintaining said connection are performed within a bridge layer inserted into the Transmission Control Protocol/Internet Protocol (TCP/IP) stack, between the Transmission Control Protocol (TCP) layer and the Internet Protocol (IP) layer, without modification to either said TCP layer or said IP layer.

55. A method as recited in claim 54, wherein said method requires no modifications to applications executing on said remote computers, or to the Transmission Control Protocol/Internet Protocol (TCP/IP) protocol stacks of said remote computer, or to other software or hardware of said remote computer, to achieve said transparent connection failover.

56. A method as recited in claim 54, wherein said communication between said remote computer and said two or more computers utilizes Transmission Control Protocol/Internet Protocol (TCP/IP) communication without the need for communication switches or routers dedicated to providing said transparent connection failover.

57. A method as recited in claim 54, wherein said transparent connection failover comprises detecting faults in said two or more computers, and the recovery from said faults to allow continued communication with said remote computer without any fault corrective actions being taken by said remote computer.

58. A method as recited in claim 57:
   wherein said recovery from faults using said transparent connection failover is sufficiently rapid;
   wherein sufficiently rapid recovery is achieved when the operation of said Transmission Control Protocol (TCP), said Internet Protocol (IP), and said remote computer, is not disrupted by said faults; and a round-trip request/reply or message/acknowledgment, requiring two messages in standard Transmission Control Protocol/Internet Protocol (TCP/IP), requires from k+1 messages to at most 2k messages, where k is the number of said two or more computers that perform said same computations.

59. A method as recited in claim 54, wherein said two or more computers comprise clients that communicate with said remote computer acting as servers.

60. A method as recited in claim 54, wherein said two or more computers are configured to operate as clients when communicating with certain remote computers and servers when communicating with other remote computers.

61. A method as recited in claim 54, wherein said two or more computers are configured to send messages to said remote computer without a client/server relationship between them.

62. A method as recited in claim 54, wherein synchronization of said Transmission Control Protocol (TCP) layers, and of said Internet Protocol (IP) layers, is maintained between said two or more computers, and also between said two or more computers and said remote computer, so that operation of said TCP layer and said IP layer is not disrupted, if a fault in one of said two or more computers occurs, where said fault in one of said two or more computers requires operation of TCP and IP to be undertaken by another of said two or more computers.

63. A method as recited in claim 54, wherein said two or more computers receive all messages transmitted to said two or more computers by said remote computer, either directly, by using a promiscuous reception mode, or as retransmissions by one of said two or more computers that receive said messages directly.

64. A method as recited in claim 54, wherein one of said two or more computers is configured to operate as a primary computer and the others of said two or more computers are configured to operate as backup computers.

65. A method as recited in claim 64, wherein said bridge routines for maintaining said connection within any of said backup computers are configured to transmit data to said primary computer instead of said remote computer.

66. A method as recited in claim 65, wherein any of said backup computers transmits to said primary computer said data in addition to the address of said remote computer to which said Transmission Control Protocol (TCP) layer of said backup computer seeks to transmit said data.

67. A method as recited in claim 66:
wherein said Transmission Control Protocol (TCP) layer of said primary computer attaches a sequence number to said data when said Transmission Control Protocol (TCP) layer of said primary computer seeks to communicate data to said remote computer;
wherein said Transmission Control Protocol (TCP) layer of said backup computer attaches a sequence number to said data when said TCP layer of said backup computer seeks to communicate data to said remote computer;
wherein said sequence number attached to said data by said Transmission Control Protocol (TCP) layer of said primary computer might not be the same as said sequence number attached to corresponding data by said TCP layer of said backup computer.

68. A method as recited in claim 67:
wherein said primary computer maintains two buffers for each fault-tolerant connection with said remote computer;
wherein a first buffer is configured for containing data bytes that said Transmission Control Protocol (TCP) layer of said primary computer seeks to transmit, together with a sequence number for each data byte; and
wherein a second buffer is configured for containing data bytes that said Transmission Control Protocol (TCP) layer of said backup computer seeks to transmit, together with a sequence number for each data byte.

69. A method as recited in claim 68, wherein said routines for maintaining said fault-tolerant connection are executed in a bridge layer of said primary computer that adjusts said sequence numbers so that, when said bridge layer of said primary computer compares data in said first buffer with data in said second buffer, said bridge layer compares data that have the same adjusted sequence numbers and that are intended to be the same data.

70. A method as recited in claim 69, wherein said bridge layer of said primary computer is configured for comparing said sequence numbers of said data bytes in said first buffer and said sequence numbers of said data bytes in said second buffer, and in which, if said bridge layer finds different data with the same sequence number in said buffers, then said bridge layer reports an error to a fault handler.

71. A method as recited in claim 70, wherein said bridge layer of said primary computer, in response to finding the same data bytes with the same sequence numbers in said first buffer and said second buffer, transmits said data bytes to said remote computer.

72. A method as recited in claim 68, wherein when said primary computer determines that said backup computer has failed, said primary computer transmits to said remote computer all data present in said first buffer, and subsequently transmits to said remote computer all data subsequently passed by said Transmission Control Protocol (TCP) layer of said primary computer to said bridge layer of said primary computer, and that are addressed to said remote computer on said fault-tolerant connection.

73. A method as recited in claim 67:
wherein said primary computer maintains two buffers for each fault-tolerant connection with said remote computer;
wherein a first buffer is configured for containing data bytes that said TCP layer of said primary computer seeks to transmit to said remote computer, together with a sequence number for each data byte; and
wherein a second buffer is configured for containing the sequence numbers of said data bytes that said TCP layer of said backup computer seeks to transmit.

74. A method as recited in claim 73, wherein said bridge layer of said primary computer in response to finding the same sequence numbers in said first buffer and in said second buffer, transmits said data bytes, associated with said sequence numbers in said first buffer, to said remote computer.

75. A method as recited in claim 67:
wherein said Transmission Control Protocol (TCP) layer of said primary computer is configured to communicate data or an acknowledgment to said remote computer;
wherein said Transmission Control Protocol (TCP) layer of said primary computer determines an acknowledgment sequence number such that said primary computer has received all data bytes sent by said remote computer on said fault-tolerant connection with sequence numbers less than or equal to said acknowledgment sequence number;
wherein said Transmission Control Protocol (TCP) layer of said backup computer determines an acknowledgment sequence number, when said TCP layer of said backup computer seeks to communicate data to said remote computer, such that said backup computer has received all data bytes sent by said remote computer on said fault-tolerant connection with sequence numbers less than or equal to said acknowledgment sequence number; and
wherein said bridge layer of said primary computer transmits to said remote computer the smaller of said acknowledgment sequence numbers determined by said Transmission Control Protocol (TCP) layer of said primary computer and said TCP layer of said backup computer.

76. A method as recited in claim 75, wherein when said remote computer transmits an acknowledgment sequence number such that said remote computer has received all data bytes sent by said primary computer on said fault-tolerant connection with sequence numbers less than or equal to said acknowledgment sequence number, said acknowledgment sequence number is adjusted by said bridge layer of said primary computer before said acknowledgment sequence number is passed to said Transmission Control Protocol (TCP) layer of said primary computer, so that said TCP layer of said primary computer discards from its buffers all data bytes that said remote computer is acknowledging.

77. A method as recited in claim 76, wherein when said remote computer transmits an acknowledgment sequence number such that said remote computer has received all data bytes sent by said primary computer on said fault-tolerant connection with sequence numbers less than or equal to said acknowledgment sequence number, said acknowledgment sequence number is adjusted by said bridge layer of said backup computer, before said acknowledgment sequence number is passed to said Transmission Control Protocol (TCP) layer of said backup computer, so that said TCP layer of said backup computer discards from its buffers all data bytes that said remote computer is acknowledging.

78. A method as recited in claim 67:
wherein when said Transmission Control Protocol (TCP) layer of said primary computer seeks to communicate data or an acknowledgment to said remote computer, said TCP layer of said primary computer determines a window size such that said primary computer is willing to accept all TCP segments from said remote computer on said fault-tolerant connection with sequence numbers within that window;
wherein when said Transmission Control Protocol (TCP) layer of one of said backup computers seeks to communicate data or an acknowledgment to said remote computer, said TCP layer of one of said backup computers determines a window size such that said one of said backup computers is willing to accept all TCP segments from said remote computer on said fault-tolerant connection with sequence numbers within that window; and
wherein said bridge layer of said primary computer is configured for transmitting to said remote computer the smaller of said window sizes determined by said Transmission Control Protocol (TCP) layer of said primary computer and said TCP layers of said one or more backup computers.

79. A method as recited in claim 67, wherein when one of said backup computers determines that said primary computer has failed, one of said backup computers transmits to said remote computer all data transmitted by said backup computer to said bridge sublayer of said failed primary computer, and that are addressed to said remote computer for said fault-tolerant connection and that were not acknowledged by said remote computer, and subsequently transmits to said remote computer all data that are subsequently passed by said Transmission Control Protocol (TCP) layer of said backup computer to said bridge layer of said backup computer, and that are addressed to said remote computer on said fault-tolerant connection.

80. A method as recited in claim 79, wherein when a new computer, or a failed and repaired computer, starts to participate in said Transmission Control Protocol (TCP) connection as said backup computer, said primary computer checkpoints the state of its applications and also checkpoints the state of its TCP layer, as a single atomic action, and communicates said checkpoints to said new or repaired backup computer, and in which said new or repaired backup computer installs said application state and said TCP layer state as a single atomic action.

81. A method as recited in claim 80, wherein said primary computer, having communicated said checkpoints to said new or repaired backup computer, does not transmit to any remote computer any data received from said Transmission Control Protocol (TCP) layer of said primary computer until matching data have been received from said new or repaired backup computer.

82. A method as recited in claim 80, wherein said primary computer, when communicating said checkpoints to said new or repaired backup computer, also communicates the sequence number offset used by said bridge in said primary computer to adjust said sequence numbers for data bytes received from said TCP layer in said primary computer.

83. A method as recited in claim 82, wherein said new or repaired backup computer, on receiving said sequence number offset from said primary computer, changes said sequence numbers in said TCP layer of said new or repaired backup computer, so that said data bytes passed to said bridge by said TCP layer of said new or repaired backup computer have exactly the same sequence numbers as said data bytes passed to said bridge by said TCP layer of said primary computer after said sequence numbers of said data bytes have been adjusted by said primary computer bridge.

84. A method as recited in claim 82, wherein said new or repaired backup computer, on receiving said sequence number offset from said primary computer, is configured to cause said bridge in said new or repaired backup computer to use said offset to adjust said sequence numbers attached to said data bytes received from said TCP layer of said new or repaired backup computer so that said data bytes have exactly the same sequence numbers as said data passed to said bridge by said TCP layer of said primary computer after said sequence numbers of said data have been adjusted by said bridge of said primary computer, and also to adjust said acknowledgment sequence numbers received from said remote computer, so that said TCP layer of said new or repaired backup computer discards from its buffers all data that said remote computer acknowledges.

85. A method as recited in claim 82:
wherein when the state of said Transmission Control Protocol (TCP) layer has been captured by said primary computer, portions of said captured state corresponding to said sequence numbers are modified, so that said data bytes passed to said bridge by said TCP layer of said new or repaired backup computer have exactly the same sequence numbers as said data passed to said bridge by said TCP layer of said primary computer after said sequence numbers of said data bytes have been adjusted by said bridge of said primary computer; and
wherein said modification can be performed within said primary computer or, alternatively, within said new or repaired backup computer.

86. A method of ensuring transparent connection failover within a network, comprising:
executing communication routines on computers connected in said network so that computations can be executed on a first computer in response to communication with a remote computer;
maintaining synchronization of at least a second computer with said first computer, within said communication routines, wherein said second computer executes the same said computations as said first computer; and
migrating the connection endpoint, within said communication routines, from said first computer to said second computer in response to the failure of said first computer, providing transparent connection failover so that said remote computer still addresses said first computer but communicates with said second computer, and said remote computer is unaware of said server failure or of said connection failover;
wherein said communication routines are configured for executing a connection-oriented communication protocol over a network communication protocol;
wherein said connection-oriented protocol is the Transmission Control Protocol (TCP);
wherein said network communication protocol is the Internet Protocol (IP);
wherein communication bridge routines are inserted between the TCP layer and the IP layer of the TCP/IP stack; and
wherein said migration of connection endpoint is performed by said communication bridge routines.

87. A method as recited in claim 86, wherein said first computer and said second computer are configured for executing the same server application for performing said computations.

88. A method as recited in claim 87, wherein said server application is replicated on both said first and said second computers using active or semi-active replication.

89. A method as recited in claim 88, wherein said first computer and said second computer comprise a primary server and a backup server.

90. A method as recited in claim 89, wherein said remote computer comprises a client of said server.

91. A method as recited in claim 90, wherein said communication routines are configured to maintain communication between said client and one of said servers in response to at least one of said servers remaining operational.

92. A method as recited in claim 89, wherein said communication routines for said primary server and said backup are configured so that said server application undergoes identical state transitions eliminating the need to transfer application state in order to achieve transparent connection failover.

93. A method as recited in claim 89:
wherein said communication routines are configured for bringing up a new backup server, or returning a failed and repaired server to the system by executing a state transfer to said new backup server; and
wherein the application state and the communication infrastructure state are transferred in said state transfer.

94. A method as recited in claim 86:
wherein said communication bridge routines comprise primary server bridge routines and backup server bridge routines;
wherein said first computer and said second computer comprise a primary server and a backup server; and
wherein said remote computer comprises a client of said servers.

95. A method as recited in claim 94, further comprising maintaining a primary server output queue and a backup server output queue within said primary server bridge routines.

96. A method as recited in claim 95, wherein said primary server output queue and said backup server output queue are maintained for each fault-tolerant connection between said client and said servers.

97. A method as recited in claim 95, further comprising maintaining payload bytes in said primary server output queue within said primary server bridge, generated by said primary server's connection-oriented communication protocol layer.

98. A method as recited in claim 95, further comprising maintaining payload bytes in said backup server output queue within said primary server bridge, where said bytes were communicated by said backup server to said primary server.

99. A method as recited in claim 98, wherein said communication routines for said primary server are configured to postpone acknowledging a client's connection-oriented protocol segment until said primary server has received an acknowledgment of that segment from said backup server.

100. A method as recited in claim 99, wherein said communication routines for said backup server are configured for maintaining a copy of all connection-oriented protocol segments sent by said primary server to said client that said client has not acknowledged.

101. A method as recited in claim 95, wherein said communication routines for said primary server and said backup server are configured for removing said connection-oriented segment from said queues in response to receiving an acknowledgment of receipt of a connection-oriented segment by said client.

102. A method as recited in claim 94, wherein said communication bridge routines are configured to synchronize the connection-oriented protocol sequence numbers utilized by said primary server and said backup server.

103. A method as recited in claim 94, wherein said communication routines are configured to modify the connection endpoint address, from said primary server to said backup server, in response to the failure of said primary server, so that said client need not establish a new connection with said backup server.

104. A method as recited in claim 94, wherein said communication routines for said backup server are configured to stay within the Maximum Segment Size (MSS) and the maximum window size that were previously negotiated between said primary server and said client when establishing the connection.

105. A method as recited in claim 86, wherein said communication bridge routines are configured to generate between k+1 and 2k messages for a request, reply, or acknowledgment, in which k represents the number of server replicas.

106. A method as recited in claim 86, wherein said communication bridge routines are configured for performing said synchronization and said connection endpoint migration without proxies or communication routines in user space at each server.

107. A method as recited in claim 86, wherein said communication bridge routines are configured to perform said transparent connection failover without modifying network infrastructure, the server application, the client application, or the Transmission Control Protocol (TCP) layer or Internet Protocol (IP) layer of the TCP/IP stack of said client.

108. A method as recited in claim 86, wherein said communication bridge routines are configured for providing said transparent connection failover without replaying the entire history of the connection between said client and said primary server.

109. A method as recited in claim 86, wherein said communication bridge routines are configured to perform said transparent connection failover without modifying the Transmission Control Protocol (TCP) layer or the Internet Protocol (IP) layer of said server and without modifying the software or hardware of said client.

110. A method as recited in claim 86, wherein said communication bridge routines are configured to perform said transparent connection failover without requiring said backup server to change its Internet Protocol (IP) address to the address of the primary server and to send a gratuitous Address Resolution Protocol (ARP) request to announce that it can now be found at the Internet Protocol (IP) address of said primary server.

111. A method as recited in claim 86, wherein said communication bridge routines are configured to perform said transparent connection failover without requiring said client to establish a network connection with a dispatcher configured for routing all traffic from said client.

112. A method as recited in claim 86, wherein said communication bridge routines are configured to perform said transparent connection failover without utilizing a front-end layer-4 switch configured to route the packets to the appropriate server.

113. A method as recited in claim 86, wherein said communication bridge routines are configured to perform said transparent connection failover without preventing multicasting or forwarding of messages from said client.

114. A method as recited in claim 86, wherein said communication bridge routines are configured to perform said transparent connection failover without the need for primary and backup servers to be operational and cooperating during the transparent connection failover after the failure of the primary server.

115. A method as recited in claim 86, wherein said communication bridge routines are configured to perform said transparent connection failover without forcing all traffic to pass through a traffic redirector within a network router.

116. A method as recited in claim 86, wherein said communication bridge routines are configured to perform said transparent connection failover without performing context switches or protocol stack traversals in user space.

* * * * *

UNITED STATES PATENT AND TRADEMARK OFFICE
CERTIFICATE OF CORRECTION

PATENT NO. : 7,251,745 B2  Page 1 of 1
APPLICATION NO. : 10/460761
DATED : July 31, 2007
INVENTOR(S) : Koch et al.

It is certified that error appears in the above-identified patent and that said Letters Patent is hereby corrected as shown below:

In the claims:
Col. 24, line 39, please replace "network:" with -- network; --;
Col. 24, line 41, please replace "bridqe" with -- bridge --;
Col. 25, line 32, please replace "orotocols" with -- protocols --;
Col. 26, line 49, please replace "passes said TOP" with -- passes said TCP --;
Col. 26, line 49, please replace "TOP" with -- TCP --;
Col. 26, line 52, please replace "TOP" with -- TCP --.

Signed and Sealed this
Thirty-first Day of May, 2011

David J. Kappos
*Director of the United States Patent and Trademark Office*